US012804084B2

(12) United States Patent
Namiki

(10) Patent No.: US 12,804,084 B2
(45) Date of Patent: Nov. 17, 2026

(54) IMAGE READING APPARATUS

(71) Applicant: SEIKO EPSON CORPORATION, Tokyo (JP)

(72) Inventor: Masaki Namiki, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 18/912,923

(22) Filed: Oct. 11, 2024

(65) Prior Publication Data

US 2025/0126214 A1 Apr. 17, 2025

(30) Foreign Application Priority Data

Oct. 11, 2023 (JP) ................................ 2023-175794

(51) Int. Cl.
*H04N 1/00* (2006.01)

(52) U.S. Cl.
CPC ..... *H04N 1/00129* (2013.01); *H04N 1/00535* (2013.01); *H04N 1/00602* (2013.01); *H04N 2201/0089* (2013.01)

(58) Field of Classification Search
CPC ........... H04N 1/00129; H04N 1/00535; H04N 1/00602; H04N 2201/0089
USPC .......................................... 358/1.1–1.18, 474
See application file for complete search history.

(56) References Cited

U.S. PATENT DOCUMENTS

| | | | | |
|---|---|---|---|---|
| 9,794,438 B2* | 10/2017 | Sawada | .............. | H04N 1/00384 |
| 10,518,997 B2* | 12/2019 | Nakai | ................ | G03G 15/5016 |
| 2018/0262646 A1 | 9/2018 | Gotoh et al. | | |
| 2019/0129566 A1* | 5/2019 | Toriyama | ........... | H04N 1/00411 |
| 2019/0132455 A1* | 5/2019 | Miyauchi | ............. | H04N 1/0066 |
| 2022/0263961 A1* | 8/2022 | Tokoro | ............... | H04N 1/00615 |

FOREIGN PATENT DOCUMENTS

JP 2017098715 A 6/2017

* cited by examiner

*Primary Examiner* — Gabriel I Garcia
(74) *Attorney, Agent, or Firm* — CHIP LAW GROUP

(57) ABSTRACT

The present disclosure includes a base unit, an opening/closing unit configured to be opened and closed with respect to the base unit, a medium setting portion that is disposed on a front surface side of the base unit, and on which a medium is placed, a transport path that is configured to be established in a state in which the opening/closing unit is closed with respect to the base unit, and through which the medium is transported in a transport direction, a reading unit disposed along the transport path, and configured to read the medium, and a display panel provided at the base unit, and configured to display information. The display panel is attached to the front surface side of the base unit and overlaps the opening/closing unit in a closed state in a width direction of the transport path in front view.

12 Claims, 19 Drawing Sheets

IMAGE READING APPARATUS

The present application is based on, and claims priority from JP Application Serial Number 2023-175794, filed Oct. 11, 2023, the disclosure of which is hereby incorporated by reference herein in its entirety.

BACKGROUND

1. Technical Field

The present disclosure relates to an image reading apparatus.

2. Related Art

As an example of this type of device, an apparatus described in JP 2017-98715 A can be cited.

JP 2017-98715 A discloses an image reading apparatus including an upper unit and a lower unit that can be opened and closed to open a transport path, and a display panel disposed at the upper unit.

In the image reading apparatus described in JP 2017-98715 A, since the display panel faces downward when the upper unit is opened, it is difficult to check a display guide on the display panel.

In addition, in an image reading apparatus of a so-called high-end machine type, in a structure in which an upper unit is opened with respect to a lower unit, a small-sized display panel is disposed on a front surface side of the image reading apparatus at a height position on one end side in a left-right direction of the lower unit at which a user can easily visually recognize the display panel. However, when a size of the display panel is increased to make it easy to see the display panel, there is a problem that a dimension of the entire device in a width direction is increased in an arrangement structure in the related art.

SUMMARY

In order to solve the above-described problems, an image reading apparatus according to the present disclosure includes a base unit, an opening/closing unit configured to be opened and closed with respect to the base unit, a medium setting portion that is disposed on a front surface side of the base unit, and on which a medium is placed, a transport path that is configured to be established in a state in which the opening/closing unit is closed with respect to the base unit, and through which the medium is transported in a transport direction, a reading unit disposed along the transport path, and configured to read the medium, and a display panel provided at the base unit, and configured to display information, wherein the display panel is disposed on the front surface side of the base unit, and overlaps the opening/closing unit in a closed state in a width direction of the transport path in front view.

DESCRIPTION OF EMBODIMENTS

Figure 1:
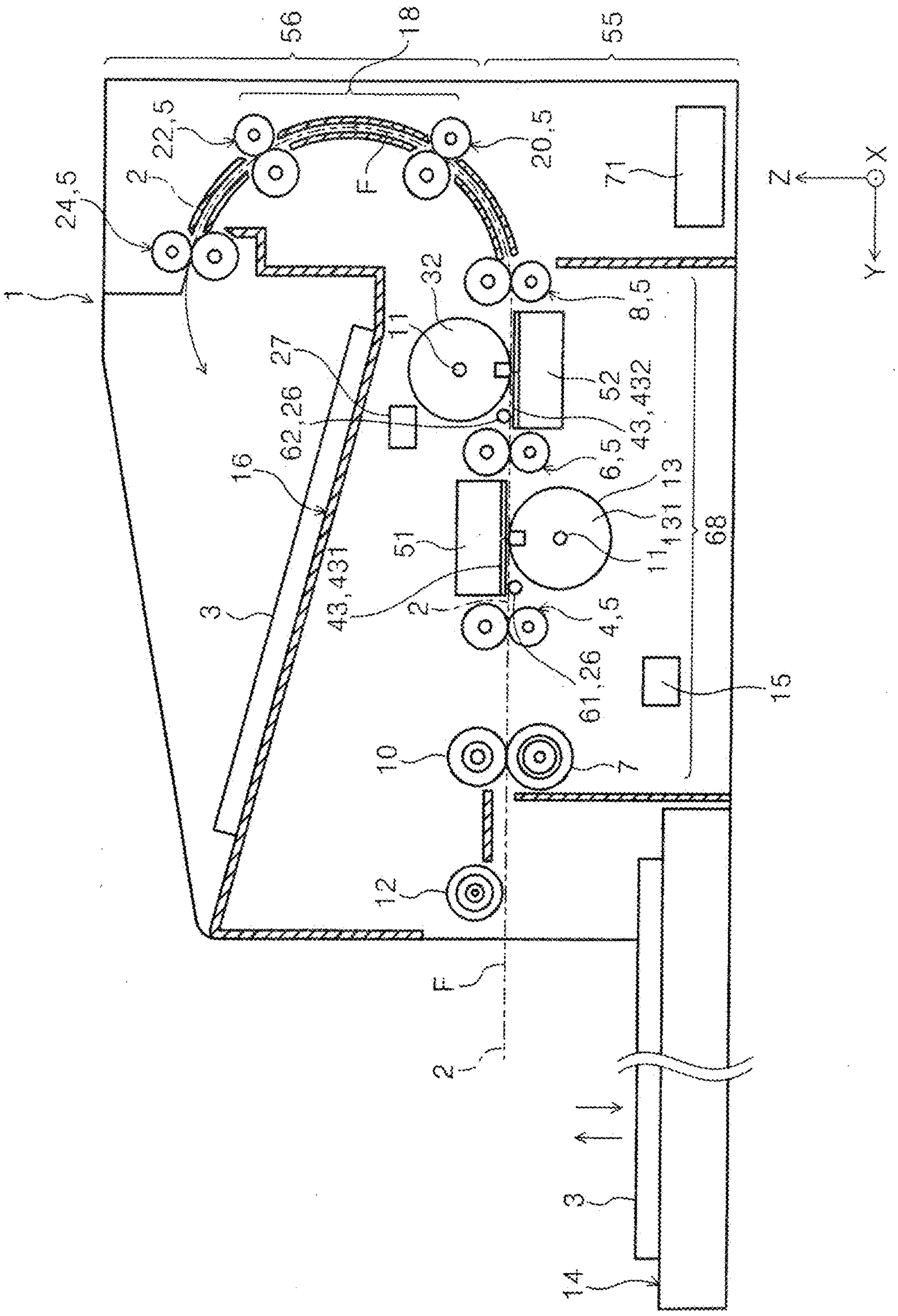
FIG. 1 is an overall schematic configuration diagram when an inside of an image reading apparatus according to Embodiment 1 is viewed from a side.

First, the present disclosure is schematically described below.

An image reading apparatus according to a first aspect of the present disclosure includes a base unit, an opening/closing unit configured to be opened and closed with respect to the base unit, a medium setting portion on which a medium is placed, the medium setting portion being disposed on a front surface side of the base unit, a transport path through which the medium is transported in a transport direction, the transport path being established in a state in which the opening/closing unit is closed with respect to the base unit, a reading unit disposed along the transport path and configured to read the medium, and a display panel provided at the base unit and configured to display information, wherein the display panel is disposed on the front surface side of the base unit, and overlaps, in front view, the opening/closing unit in a closed state in a width direction of the transport path.

Here, the "front surface side of the base unit" means a front surface side of the image reading apparatus. In addition, "established" in a "transport path which is established in a state in which the opening/closing unit is closed with respect to the base unit, and through which the medium is transported in a transport direction" means that, the transport path is brought into a state in which the medium can be transported with the opening/closing unit closed with respect to the base unit.

According to the present aspect, the display panel is disposed on the front surface side of the base unit, and is disposed so as to overlap the opening/closing unit in the closed state in the width direction of the transport path in front view. Accordingly, even when the display panel is increased in size in the width direction and mounted by increasing a size of the display panel in an overlapping direction in the width direction, it is possible to suppress an increase in size of the entire image reading apparatus in the width direction.

A second aspect of the image reading apparatus according to the present disclosure is an aspect depending on the first aspect, and includes a feeding unit configured to feed the medium placed on the medium setting portion in the transport direction, and a discharge unit configured to discharge, to a discharge receiving portion, the medium transported through the transport path and passing through the reading unit, wherein the discharge receiving portion is provided at the opening/closing unit.

According to the present aspect, it is possible to obtain the same effect as that of the first aspect in the image reading apparatus having a structure in which the feeding unit, the discharge unit, and the discharge receiving portion are provided and the discharge receiving portion is provided at the opening/closing unit.

A third aspect of the image reading apparatus according to the present disclosure is an aspect depending on the first aspect, wherein the display panel overlaps, in front view, the opening/closing unit in the closed state in a height direction. Note that the present aspect may also be dependent on the second aspect.

According to the present aspect, the display panel overlaps, in front view, the opening/closing unit in the closed state in the height direction. That is, by setting the size of the display panel so as not to protrude from a region of the opening/closing unit in the height direction in the front view, it is possible to further suppress an increase in size in the height direction in addition to the width direction.

A fourth aspect of the image reading apparatus according to the present disclosure is an aspect depending on the third aspect, wherein the opening/closing unit is formed with a recessed portion at a portion overlapping the display panel, and the recessed portion is configured to accommodate the display panel.

According to the present aspect, the recessed portion is formed at the portion of the opening/closing unit overlapping the display panel, and the display panel can be accommodated in the recessed portion. Accordingly, it is possible to further suppress an increase in size of the image reading apparatus in a depth direction in addition to the width direction and the height direction. Further, it is possible to prevent interference with the display panel in an opening/closing operation of the opening/closing unit.

A fifth aspect of the image reading apparatus according to the present disclosure is an aspect depending on the first aspect, wherein a height position of the display panel of the opening/closing unit in an open state is the same as a height position of the display panel of the opening/closing unit in the closed state. Note that the present aspect may also be dependent on any one of the second to fourth aspects.

According to the present aspect, the height position of the display panel of the opening/closing unit in the open state is the same as the height position of the display panel of the opening/closing unit in the closed state. That is, since the height position of the display panel does not change regardless of the open or closed state of the opening/closing unit, display information can be easily checked on the display panel.

A sixth aspect of the image reading apparatus according to the present disclosure is an aspect depending on the first aspect, wherein the medium setting portion is rotatable with a base end as a rotational fulcrum, and is displaceable between an unfolded state and a housed state by rotation, and the display panel is covered with the medium setting portion when the medium setting portion is in the housed state. Note that the present aspect may also be dependent on any one of the second to fifth aspects.

According to the present aspect, the medium setting portion is displaceable between the unfolded state and the housed state by rotation with the base end as the rotational fulcrum, and the display panel is covered with the medium setting portion in the housed state of the medium setting portion. Thus, the display panel can be protected when the image reading apparatus is not in use.

When the present aspect is dependent on the third aspect, a gap in the depth direction when the medium setting portion is in the housed state is reduced.

A seventh aspect of the image reading apparatus according to the present disclosure is an aspect depending on the sixth aspect, wherein at least a part of a region of the medium setting portion covering the display panel is a light transmissive member.

According to the present aspect, at least a part of the region of the medium setting portion covering the display panel is the light transmissive member. Accordingly, even in the state in which the display panel is covered with the medium setting portion, it is possible to check information displayed on the display panel, and it is convenient for a user.

An eighth aspect of the image reading apparatus according to the present disclosure is an aspect depending on the first aspect, wherein a position of a free end of the display panel is changeable from a default position by rotation with a base end as a rotational fulcrum.

According to the present aspect, the position of the free end of the display panel is changeable from the default position by rotation with the base end as the rotational fulcrum. Accordingly, an orientation of the display panel can be easily changed so as to be easily viewed from the user. In addition, when the display panel becomes an obstacle at the time of maintenance work such as cleaning of the base unit or replacement of parts, the maintenance work is facilitated by causing the rotation to be performed.

A ninth aspect of the image reading apparatus according to the present disclosure is an aspect depending on the eighth aspect, wherein the medium setting portion is rotatable with a base end as a rotational fulcrum, is displaceable between an unfolded state and a housed state by rotation, and pushes the display panel back to the default position when the medium setting portion transitions from the unfolded state to the housed state in a state in which the position of the free end of the display panel is changed from the default position.

According to the present aspect, the medium setting portion is configured to push the display panel back to the default position, when the medium setting portion transitions from the unfolded state to the housed state, in the state in which the position of the free end of the display panel is changed from the default position. Thus, it is convenient for the user.

A tenth aspect of the image reading apparatus according to the present disclosure is an aspect depending on the ninth aspect, and includes a driving mechanism configured to move the medium setting portion in the housed state upward, and a first applying mechanism configured to apply force to the medium setting portion for moving the medium setting portion from a position of the housed state to a position of the unfolded state when the medium setting portion is moved upward by the driving mechanism.

According to the present aspect, a configuration is adopted in which, when the medium setting portion is moved upward by the driving mechanism, the first applying mechanism applies force to the medium setting portion for moving from the position of the housed state to the position of the unfolded state. Accordingly, for example, when the driving mechanism is driven by turning on a power supply, the medium setting portion starts to move upward, and additionally the first applying mechanism can act on the medium setting portion and automatically move the medium setting portion from the position of the housed state to the position of the unfolded state, which is convenient for the user.

An eleventh aspect of the image reading apparatus according to the present disclosure is an aspect depending on the first aspect, wherein the medium setting portion is rotatable with a base end as a rotational fulcrum, is displaceable between an unfolded state and a housed state by rotation, and further includes a notch portion, and the display panel is housed in the notch portion when the medium setting portion is in the housed state. Note that the present aspect may also be dependent on any one of the second to fifth aspects, and the eighth aspect.

According to the present aspect, the medium setting portion is displaceable between the unfolded state and the housed state by rotation, and further includes the notch portion, and the display panel is configured to be housed in the notch portion when the medium setting portion is in the housed state. Accordingly, even in a state in which the medium setting portion is at the position of the housed state, it is possible to check information displayed on the display panel, and it is convenient for the user.

A twelfth aspect of the image reading apparatus according to the present disclosure is an aspect depending on the eleventh aspect, wherein a position of a free end of the display panel is changeable from a default position by rotation with a base end as a rotational fulcrum, and a driving mechanism configured to moves the medium setting portion in the housed state upward, a second applying mechanism that applies force to the display panel for changing from a default position when the medium setting portion is moved upward by the driving mechanism, and a first applying mechanism that applies force to the medium setting portion for moving from a position of the housed state to a position of the unfolded state when the medium setting portion is further moved upward by the driving mechanism are included.

According to the present aspect, when the medium setting portion is moved upward by the driving mechanism, the second applying mechanism applies force to the display panel for changing from the default position. Subsequently, the first applying mechanism is configured to apply force to the medium setting portion for moving the medium setting portion from the position of the housed state to the position of the unfolded state. Accordingly, for example, when the driving mechanism is driven by turning on the power supply, the medium setting portion starts to move upward, the second applying mechanism acts on the display panel to rotate the display panel, and the first applying mechanism acts on the medium setting portion to automatically move the medium setting portion from the position of the housed state to the position of the unfolded state. That is, it is possible to sequentially and automatically perform changing the display panel from the default position to a use position, and transition of the medium setting portion to the unfolded state, which is convenient for the user.

EMBODIMENTS

Hereinafter, embodiments of an image reading apparatus according to the present disclosure will be specifically described based on FIGS. 1 to 19.

In the following description, three axes that are orthogonal to each other are referred to as an X-axis, a Y-axis, and a Z-axis, respectively, as illustrated in each of the drawings. Directions indicated by arrows of the three axes (X, Y, Z) are + directions of the respective directions, and opposite directions are − directions. A Z-axis direction corresponds to a vertical direction, that is, a direction in which gravity acts, a +Z direction indicates a vertically upward direction, and a −Z direction indicates a vertically downward direction. An X-axis direction and a Y-axis direction correspond to horizontal directions. A +Y direction indicates a forward direction of the apparatus, and a −Y direction indicates a rearward direction of the apparatus. A +X direction indicates a rightward direction of the apparatus, and a −X direction indicates a leftward direction of the apparatus.

Overall Configuration of Image Reading Apparatus

An image reading apparatus 1 according to the present embodiment is a scanner capable of reading an image on a medium serving as a manuscript. Here, the image means what is visually recorded on the medium, and is, for example, a character, a figure, a table, a picture, a photograph, or the like. In addition, the medium is not limited to a sheet, and also includes a card, a booklet, and the like. The image reading apparatus 1 is not limited to the scanner, and may be a copier, a facsimile machine, or the like.

As illustrated in FIG. 1, the image reading apparatus 1 according to the present embodiment includes two reading units, a first reading unit 51 and a second reading unit 52, for reading images on a medium 3. Additionally, a first transport roller 4 that transports the medium 3 along a transport path 2 in a transport direction F, and is provided upstream of the first reading unit 51 in the transport direction F, a second transport roller 6 provided upstream of the second reading unit 52 positioned downstream of the first reading unit 51, and a third transport roller 8 provided downstream of the second reading unit 52.

A roller pair of a feed roller 10 and a separation roller 7 are disposed upstream of the first transport roller 4 in the transport direction F. The feed roller 10 is a driving roller that is rotated by power of a third driving unit 15, and transports the medium 3 in the transport direction F. The separation roller 7 is a driving roller that is rotated by power of a driving source (not illustrated), and is a roller that separates one medium from a plurality of the media 3.

Here, the separation roller 7 is rotated in a direction in which the medium 3 is fed upstream (the +Y direction) in the transport direction F by the power of the driving source. The separation roller 7 includes a torque limiter (not illustrated), and when torque exceeding a set value is applied to the torque limiter, the separation roller 7 is driven to rotate in a direction in which the medium 3 is fed downstream (the −Y direction) in the transport direction F.

A pick roller 12 as a feeding unit 12 (the same reference numeral is used) is disposed upstream of the separation roller 7. The pick roller 12 is a driving roller that is rotated by the power of the third driving unit 15, similarly to the feed roller 10, and feeds the medium 3 in the transport direction F. The first transport roller 4, the second transport roller 6, and the third transport roller 8, which constitute a transport unit 5 that transports the medium 3 in the transport direction F, also include driving rollers that are rotated by the power of the third driving unit 15.

As illustrated in FIG. 1, in the present embodiment, a curved inversion path 18 is provided downstream of a straight path 68 from the feed roller 10 to the third transport roller 8, that is, downstream of the third transport roller 8. In the curved inversion path 18, a fourth transport roller 20, a fifth transport roller 22, and a discharge roller pair 24 as a discharge unit 24 (the same reference numeral is used) are disposed in this order along the transport direction F.

A discharge receiving portion 16 that receives the medium 3 discharged from the curved inversion path 18 is disposed above the straight path 68 for compactification.

In FIG. 1, a reference numeral 71 denotes a control unit. The control unit 71 controls driving of the third driving unit 15 and driving of a fourth driving unit 27 to be described later so as to correspond to transport of the medium 3. The third driving unit 15 and the fourth driving unit 27 include motors.

The control unit 71 includes a CPU, a flash ROM, and a RAM. The CPU performs various arithmetic processing according to a program stored in the flash ROM, and controls operation of the entire image reading apparatus 1. The flash ROM serving as an example of a storage unit is a readable and rewritable nonvolatile memory. The RAM serving as an example of a storage unit temporarily stores a variety of information.

In FIG. 1, a reference numeral 14 denotes a medium setting portion on which the medium 3 to be read is set. The medium 3 on the medium setting portion 14 is to be transported through the transport path 2 and finally discharged to the discharge receiving portion 16.

The medium setting portion 14 is configured to move up and down. When the medium 3 set on the medium setting portion 14 is fed in the transport direction F, first, the medium setting portion 14 is moved upward (the +Z direction) by power transmitted from a driving source (not illustrated), and stops in a state in which the medium 3 positioned uppermost among the set media 3 is in contact with the pick roller 12. When the pick roller 12 rotates in this state, the medium 3 is fed in the transport direction F, and a leading end of the medium 3 reaches a nip position of the roller pair of the feed roller 10 and the separation roller 7.

In a multi-feed state in which a plurality of the media 3 are fed, one medium 3 is separated by the separation roller 7, the one medium 3 is transported in the transport direction F by the first transport roller 4, and an image on a first surface of the medium 3 is read by the first reading unit 51. Further, the medium 3 subjected to the reading by the first reading unit 51 is transported by the second transport roller 6, and reading of an image on a second surface on an opposite side to the first surface of the medium 3 is performed by the second reading unit 52.

The medium 3 subjected to the reading by the second reading unit 52 is fed to the curved inversion path 18 by the third transport roller 8, is transported by the fourth transport roller 20 and the fifth transport roller 22, and is discharged to the discharge receiving portion 16 by the discharge roller pair 24.

As illustrated in FIG. 1, in the present embodiment, the first reading unit 51 and the second reading unit 52 that read the images on the medium 3 transported in the transport direction F include a first translucent member 431 and a second translucent member 432 which are translucent members 43 disposed between the transport path 2 and the first reading unit 51, and between the transport path 2 and the second reading unit 52, respectively.

As illustrated in FIG. 1, a first rotating member 131 as a rotating member is disposed on an opposite side of the first reading unit 51 of the first translucent member 431, and a second rotating member 32 as a rotating member is disposed on an opposite side of the second reading unit 52 of the second translucent member 432. The first rotating member 131 and the second rotating member 32 are disposed to face the first reading unit 51 and the second reading unit 52, respectively, and are each rotatable about a shaft 11. The first rotating member 131 and the second rotating member 32 each have a substantially cylindrical shape, and are formed to have lengths with which reading ranges (the X-axis direction) of the first reading unit 51 and the second reading unit 52 can be covered, respectively.

Further, as illustrated in FIG. 1, each of the first rotating member 131 and the second rotating member 32 rotates around the shaft 11 by power of the fourth driving unit 27 which is a common driving source. Rotational operation of the first rotating member 131 and the second rotating member 32 is controlled by the control unit 71.

Note that the first rotating member 131 and the second rotating member 32 may be configured to be rotated by power of, instead of the common fourth driving unit 27, individual motors, respectively.

The first reading unit 51, the first translucent member 431, and the second rotating member 32 are disposed above the transport path 2. The second reading unit 52, the second translucent member 432, and the first rotating member 131 are disposed below the transport path 2.

As illustrated in FIG. 1, in the present embodiment, the image reading apparatus 1 includes a base unit 55 and an opening/closing unit 56. The opening/closing unit 56 is configured to be opened and closed by being rotated in a vertical direction with respect to the base unit 55 by an opening/closing mechanism (not illustrated).

The base unit 55 includes the second reading unit 52, the second translucent member 432, and the first rotating member 131. The opening/closing unit 56 includes the first reading unit 51, the first translucent member 431, and the second rotating member 32. Then, in a state in which the opening/closing unit 56 is closed with respect to the base unit 55, as illustrated in FIG. 1, the second translucent member 432 and the second rotating member 32 are disposed to face each other, and the first translucent member 431 and the first rotating member 131 are disposed to face each other.

In a state in which the opening/closing unit 56 is opened with respect to the base unit 55, although not illustrated, the second translucent member 432 and the second rotating member 32 are configured not to face each other, and the first translucent member 431 and the first rotating member 131 are configured not to face each other. That is, facing surfaces of the base unit 55 and the opening/closing unit 56 are exposed and accessible by the user.

In addition, as illustrated in FIG. 1, in the present embodiment, a first transport assisting unit 61 facing the first translucent member 431 and disposed upstream of the first rotating member 131, and a second transport assisting unit 62 facing the second translucent member 432 and disposed upstream of the second rotating member 32, as transport assisting units that assist transport of the medium 3 are provided. Here, each of the first transport assisting unit 61 and the second transport assisting unit 62 includes a driving roller 26 called a platen roller 26 that is rotated by power of the third driving unit 15 being transmitted thereto.

First Embodiment

Following the description of the overall structure of the image reading apparatus 1 described above, Embodiment 1 of the image reading apparatus 1 will be described below although the description is partially redundant.

Figure 2:
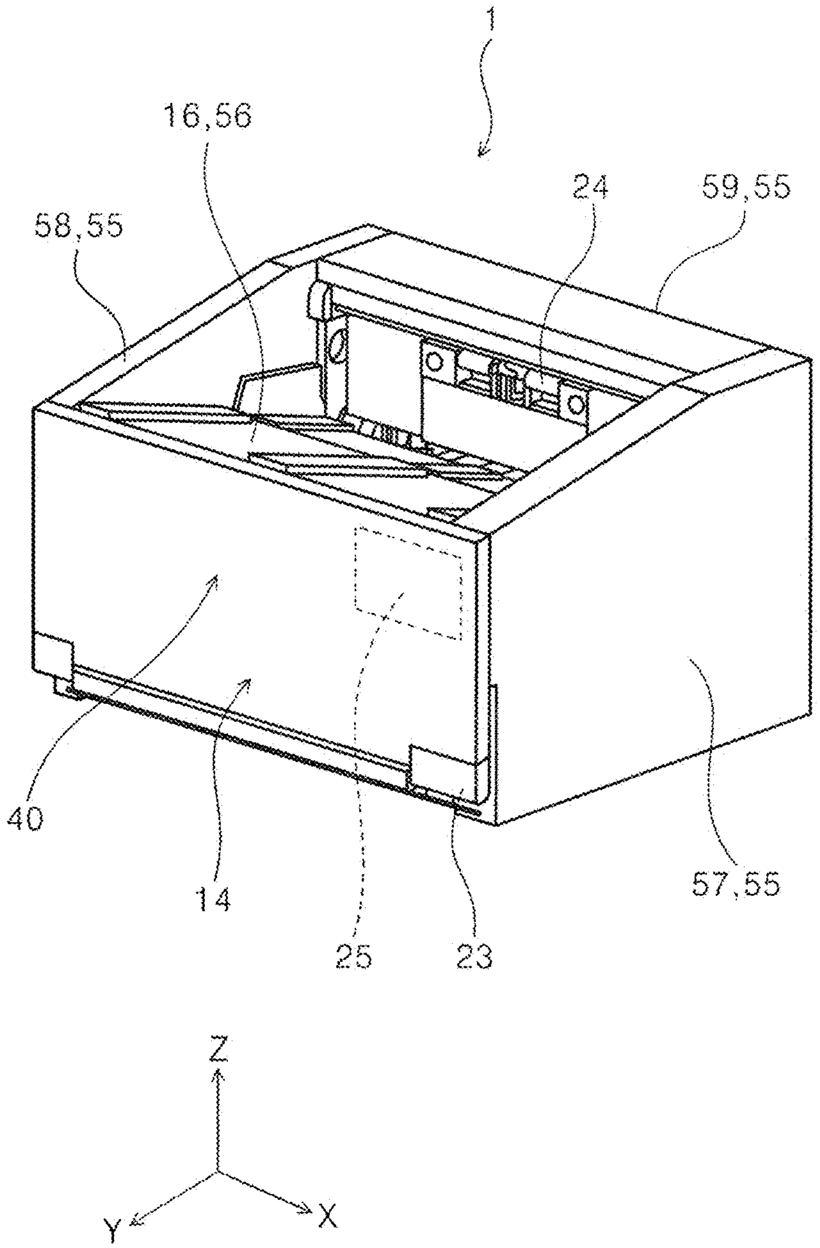
FIG. 2 is an overall perspective view of the image reading apparatus according to Embodiment 1.
Figure 3:
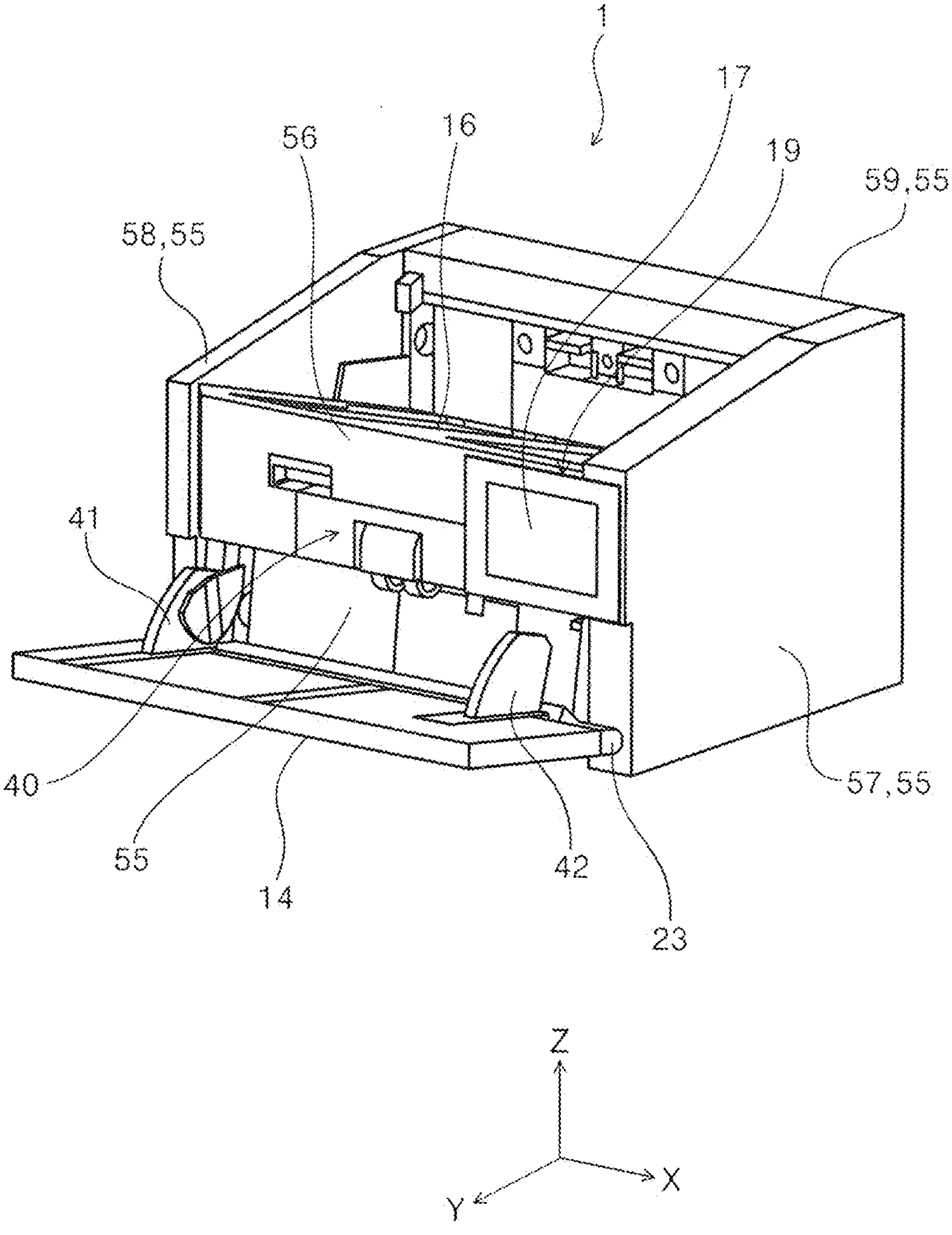
FIG. 3 is an overall perspective view of the image reading apparatus according to Embodiment 1.
Figure 6:
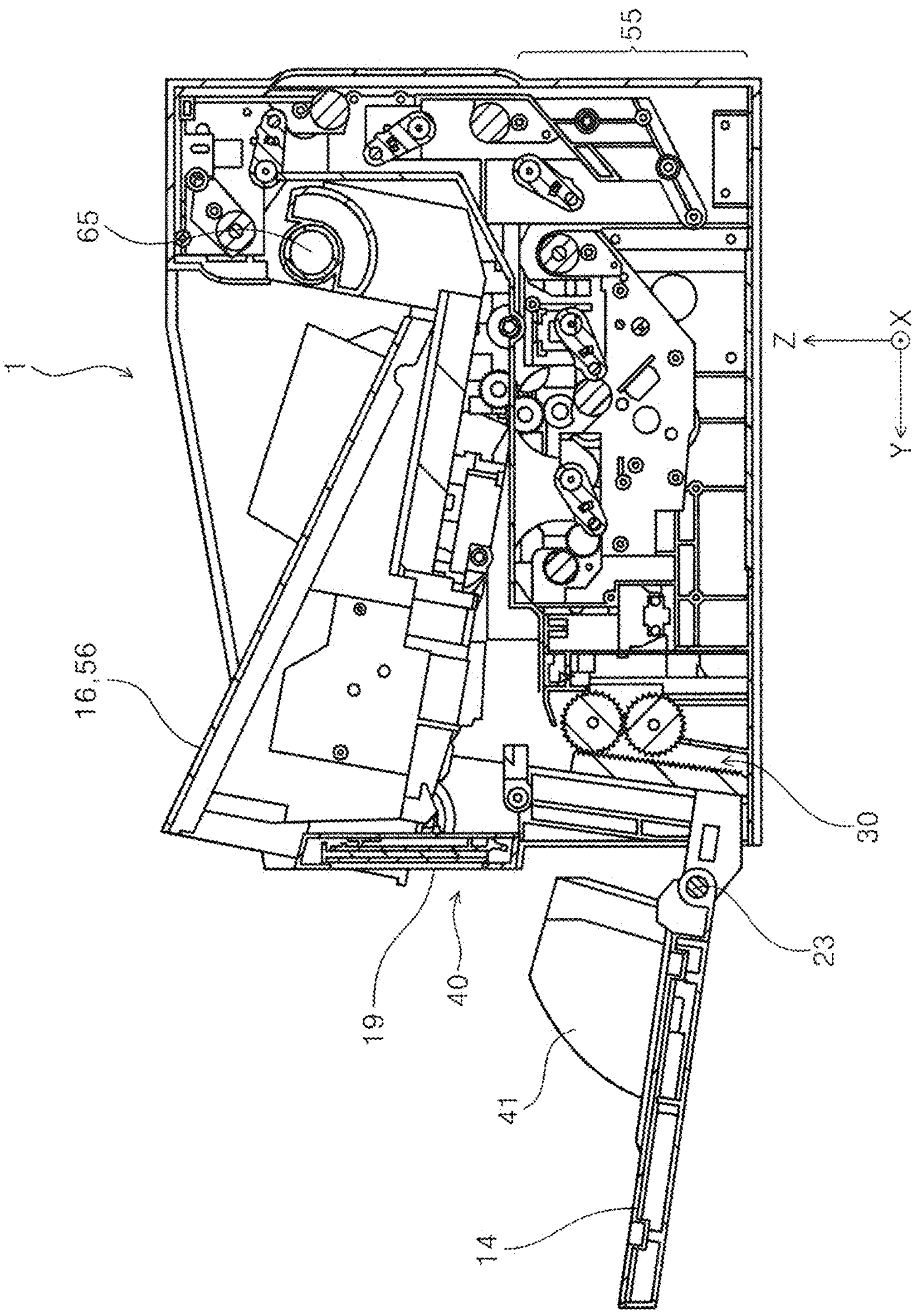
FIG. 6 is an overall cross-sectional side view of the image reading apparatus according to Embodiment 1.
Figure 7:
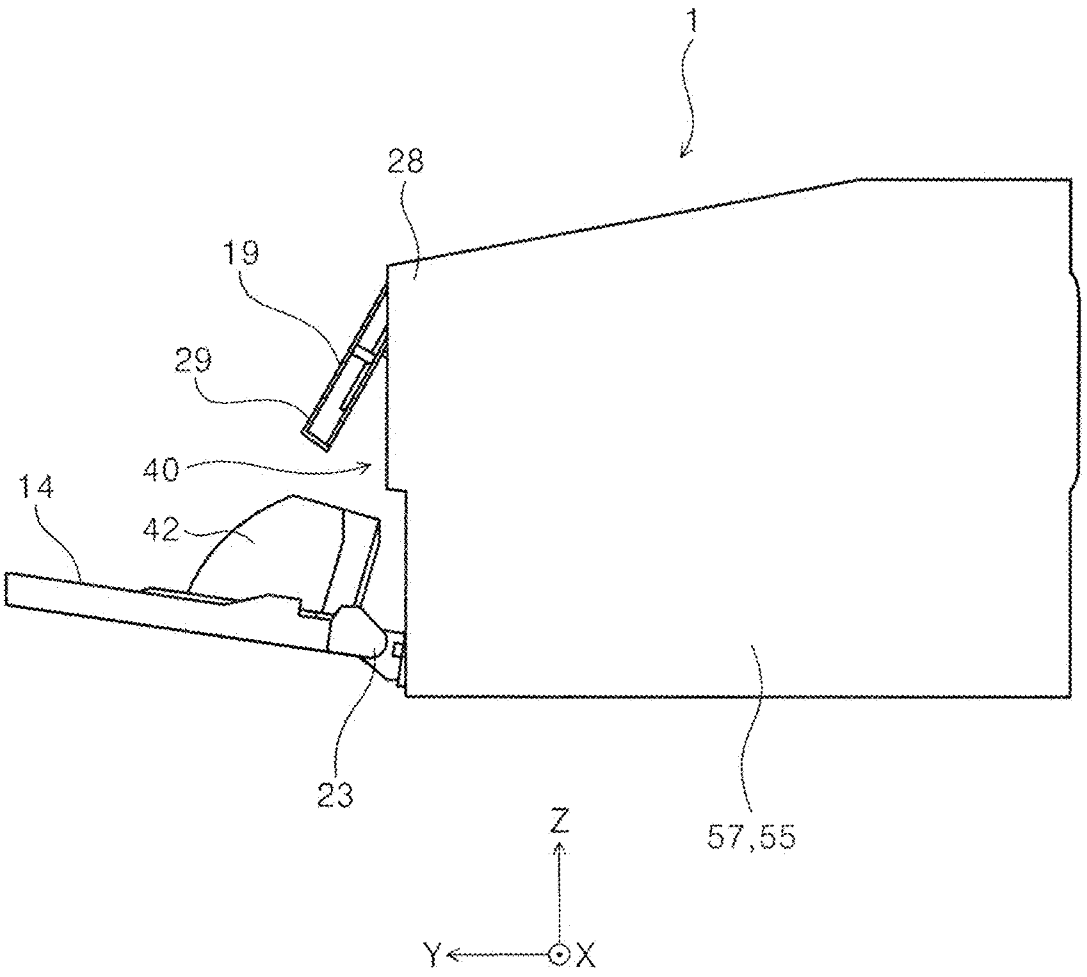
FIG. 7 is an overall side view of the image reading apparatus according to Embodiment 1.

As illustrated in FIGS. 1 to 7, the image reading apparatus 1 according to the present embodiment includes the base unit 55, the opening/closing unit 56 that can be opened and closed with respect to the base unit 55, the medium setting portion 14 that is disposed on a front surface side 40 of the base unit 55 and on which the medium 3 is placed, and the transport path 2 that is established in the state in which the opening/closing unit 56 is closed with respect to the base unit 55 (FIGS. 1, 2, 3, 5, and 7), and through which the medium 3 is transported in the transport direction F. The base unit 55 includes, as a housing, a right cover 57, a left cover 58, and a rear cover 59. In FIG. 3, reference numerals 41 and 42 denote edge guides. In FIGS. 6 and 7, a reference numeral 65 denotes a hinge. The opening/closing unit 56 can be switched between a state in FIG. 5 being the closed state and a state in FIG. 6 being the open state by rotating with the hinge 65 as a rotational fulcrum.

Here, the front surface side 40 of the base unit 55 means the front surface side 40 (denoted by the same reference numeral) of the image reading apparatus 1. In addition, "established" in the "transport path 2 that is established in the state in which the opening/closing unit 56 is closed with respect to the base unit 55, and through which the medium 3 is transported in the transport direction F" means that, the transport path 2 is brought into the state in which the medium 3 can be transported with the opening/closing unit 56 closed with respect to the base unit 55.

Further, in the present embodiment, the first reading unit 51 and the second reading unit 52 (FIG. 1) as the reading units which are disposed along the transport path 2 and read images on the medium 3, and a display panel 19 (FIGS. 3 to 6) which displays information necessary when the image reading apparatus 1 is used are provided.

The display panel 19 is disposed on the front surface side 40 of the base unit 55, and is disposed so as to overlap the opening/closing unit 56 in the closed state in the width direction (X-axis direction) of the transport path 2 in front view. A reference numeral 17 denotes a screen of the display panel 19.

As illustrated in FIG. 7, in the present embodiment, a position of a free end 29 is configured to be changeable from a default position (FIG. 3) by rotating the display panel 19 with a base end 28 as a rotational fulcrum. The default position corresponds to a state in which the display panel faces in the +Y direction and is positioned in a direction along the Z-axis, and the free end is positioned in the −Z direction with respect to the base end. Here, the display panel 19 is disposed such that the base end 28 is above the free end 29, and rotates in the vertical direction. Specifically, the display panel 19 is attached to an inner surface of the right cover 57 via a hinge (not illustrated) in a state in which the free end 29 is rotated with the base end 28 as the rotational fulcrum to change an orientation of the screen 17. In the present embodiment, the display panel 19 is manually rotated.

Here, the display panel 19 is disposed such that a part on a right side (the +X side) also overlaps a portion on the front surface side 40 of the right cover 57. Further, the display panel 19 is disposed so as not to protrude rightward (the +X side) from the right cover 57.

In other words, the display panel 19 is attached not to the opening/closing unit 56 which is displaced by the opening/closing operation, but to the base unit 55 which is not displaced, and the display panel 19 is configured so as not to be displaced even when the opening/closing unit 56 is displaced by the opening/closing operation.

In addition, in the present embodiment, as described above, the pick roller 12 is provided as the feeding unit 12 that feeds the medium 3 placed on the medium setting portion 14 in the transport direction F. Furthermore, the discharge roller pair 24 is provided as the discharge unit that discharges the medium, which is transported in the transport direction F through the transport path 2, passes through the first reading unit 51 and the second reading unit 52, and passes through the inversion path 18, to the discharge receiving portion 16. The discharge receiving portion 16 is provided at the opening/closing unit 56.

Additionally, as illustrated in FIG. 3, in the present embodiment, the display panel 19 is configured to overlap the opening/closing unit 56 in the closed state in a height direction in front view. That is, the display panel 19 is disposed at a position where setting of the medium 3 on the medium setting portion 14 and feeding of the set medium 3 in the transport direction F by the pick roller 12 are not hindered.

In other words, a configuration is adopted in which a height position of the display panel 19 in the open state of the opening/closing unit 56 is the same as a height position of the display panel 19 in the closed state of the opening/closing unit 56. Here, "the same" does not necessarily mean that the height positions are exactly the same, but it is desirably that either does not protrude upward.

Figure 4:
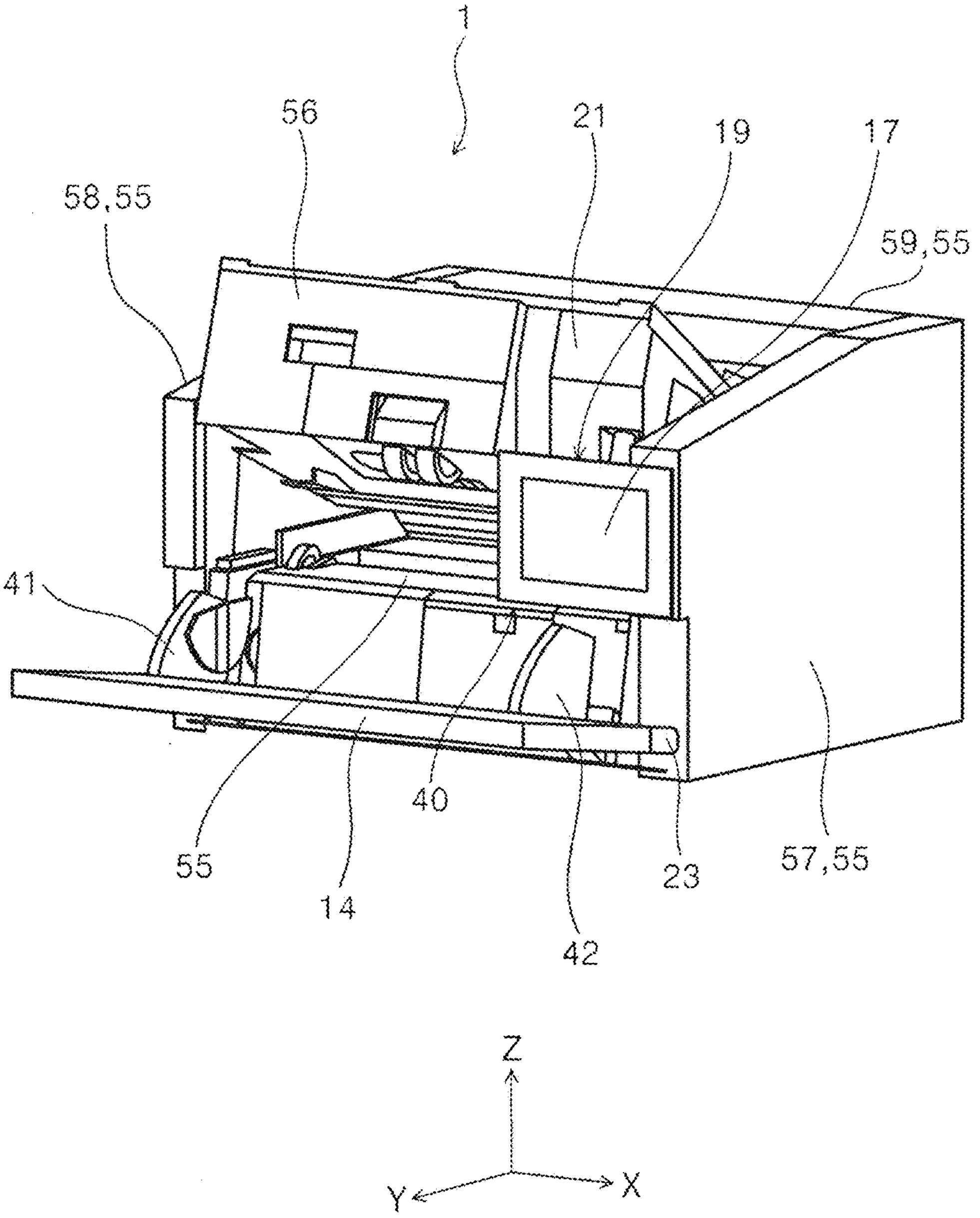
FIG. 4 is an overall perspective view of the image reading apparatus according to Embodiment 1.
Figure 5:
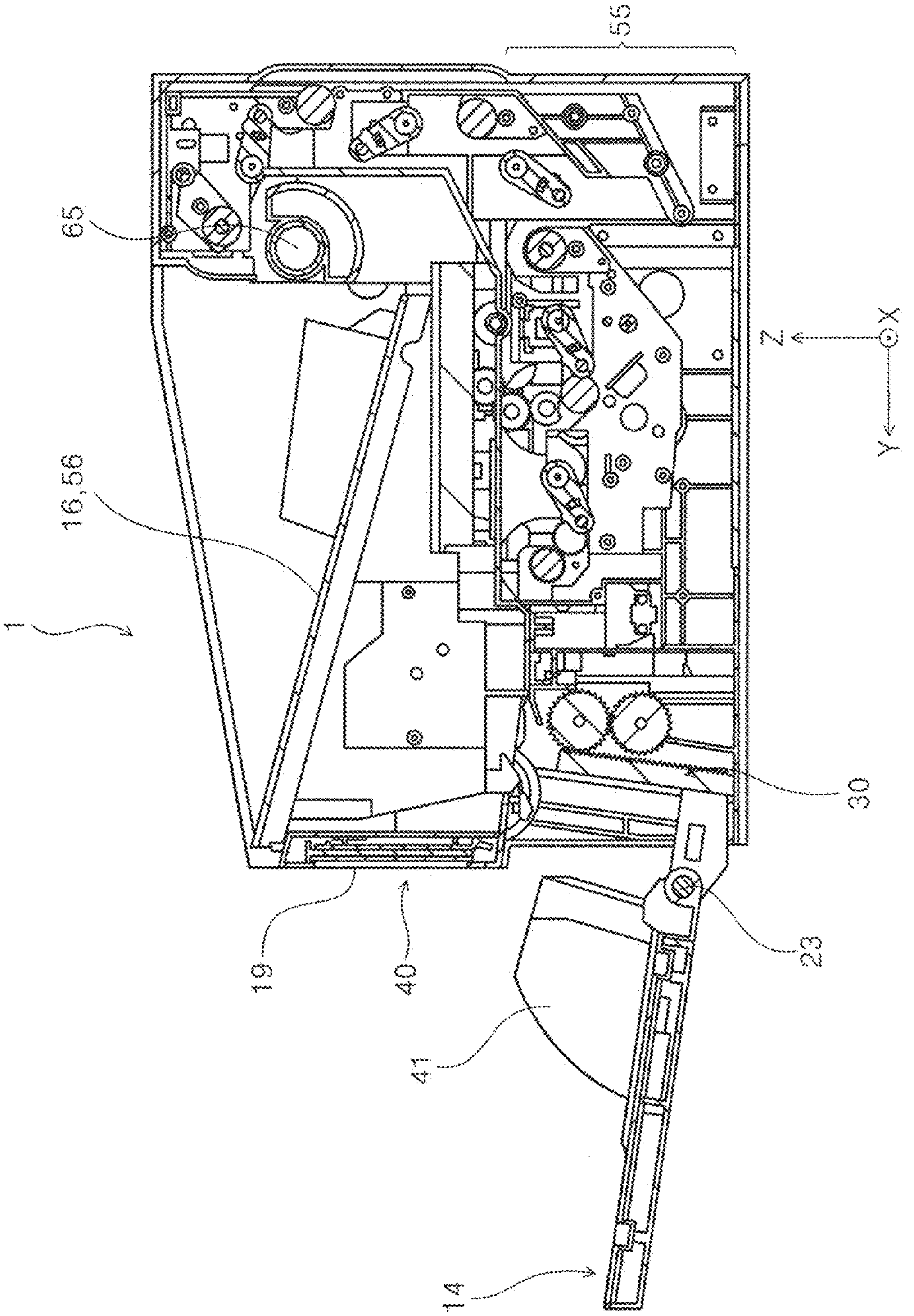
FIG. 5 is an overall cross-sectional side view of the image reading apparatus according to Embodiment 1.

Additionally, as illustrated in FIG. 4, a configuration is adopted in which, the opening/closing unit 56 has a recessed portion 21 formed at a portion overlapping the display panel 19 and the display panel 19 can be accommodated in the recessed portion 21. FIG. 3 illustrates a state in which the free end 29 is at the default position (FIG. 3) and the display panel 19 is accommodated in the recessed portion 21.

Here, a depth of the recessed portion 21 is configured such that a position in a depth direction (the Y-axis direction) of the screen 17 of the display panel 19 is substantially the same as a position on the front surface side 40 of the opening/closing unit 56, that is, configured to be substantially the same as a thickness of the display panel 19.

In addition, as illustrated in FIG. 3 and the like, in the present embodiment, the medium setting portion 14 is rotatable with a base end 23 as a rotational fulcrum. The medium setting portion 14 is configured to be displaceable between an unfolded state (FIG. 3) and a housed state (FIG. 2) by rotation. In the present embodiment, the rotation is performed manually. The medium 3 can be set by bringing the medium setting portion 14 into the unfolded state (FIG. 3).

As illustrated in FIG. 2, the display panel 19 is configured to be covered with the medium setting portion 14 when the medium setting portion 14 is in the housed state (FIG. 2).

In addition, in the present embodiment, at least a part of a region of the medium setting portion 14 that covers the display panel 19 is formed of a light transmissive member 25. Since the light transmissive member 25 is provided, even when the medium setting portion 14 remains in the housed state, the user can visually recognize the screen 17 of the display panel 19 positioned behind the medium setting portion 14. Note that it is needless to say that the light transmissive member 25 need not be used.

In addition, in the above description, as illustrated in FIG. 7, the structure has been illustrated in which the display panel 19 is rotated in the vertical direction.

Figure 9:
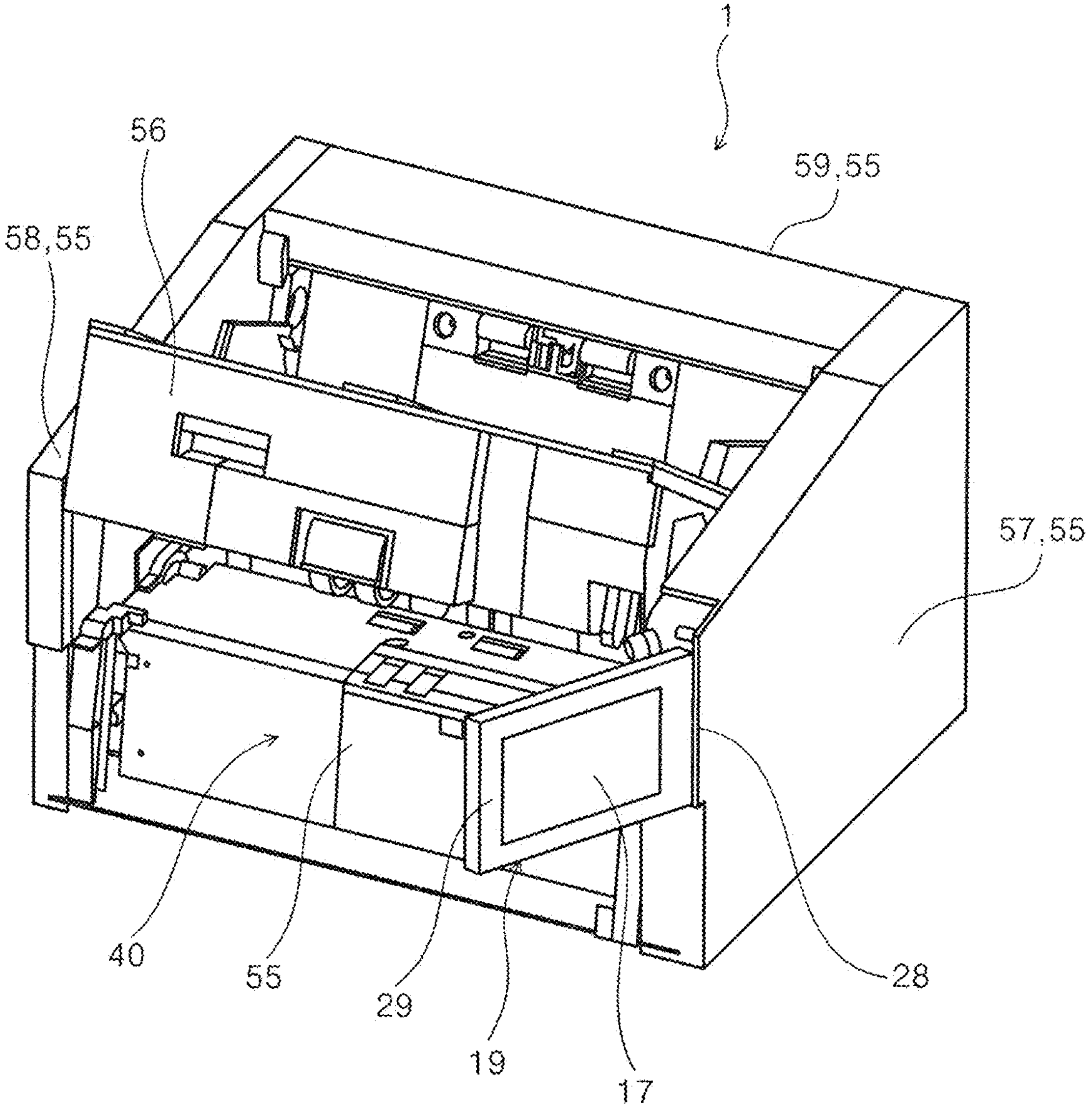
FIG. 9 is a perspective view of a main part of a modification of the image reading apparatus according to Embodiment 1.

As illustrated in FIG. 9, as a modification, the display panel 19 may be structured to be rotated in a lateral direction (the X-axis direction). That is, a right side portion of the display panel 19 may be used as the base end 28 serving as a rotational fulcrum, and a left side portion may be used as the free end 29. Here, the base end 28 side of the display panel 19 is attached to a portion on the front surface side 40 of the right cover 57 via a hinge (not illustrated).

Also in the case of this structure, when a position of the free end 29 is returned to a default position (FIG. 3), the display panel 19 is accommodated in the recessed portion 21. Note that in FIG. 9, the medium setting portion 14 is not illustrated.

Figure 8:
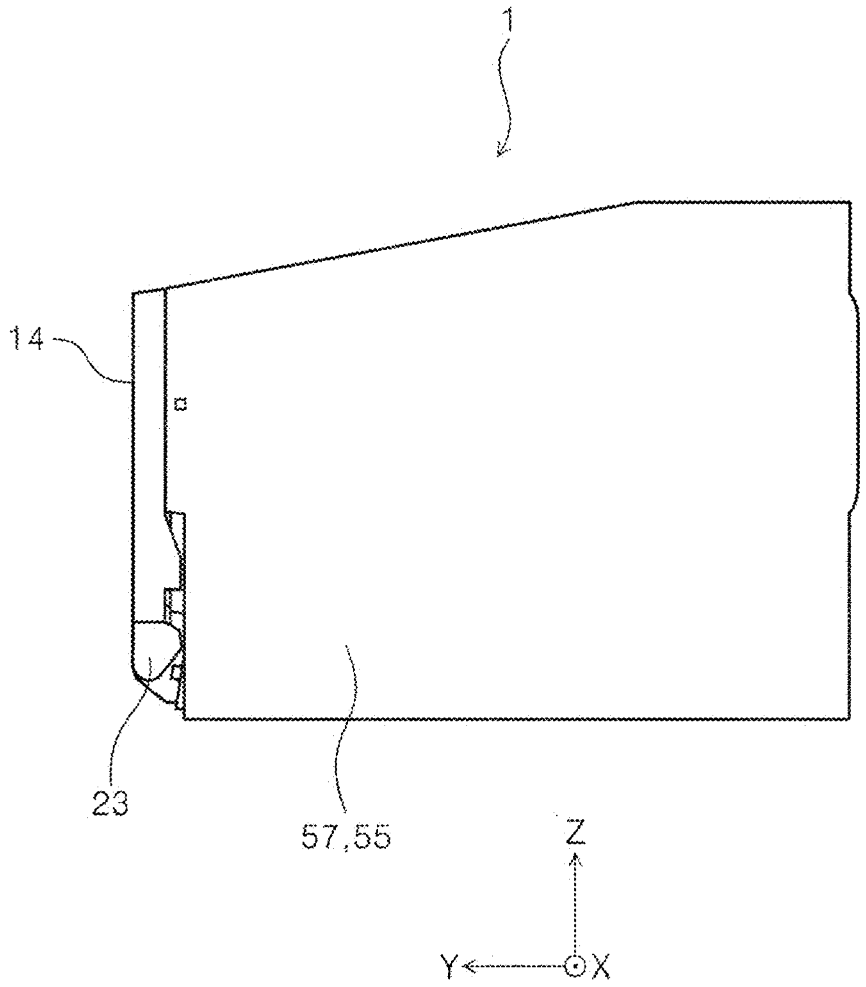
FIG. 8 is an overall side view of the image reading apparatus according to Embodiment 1.

Additionally, as illustrated in FIGS. 7 and 8, in the present embodiment, the medium setting portion 14 is configured to be able to push the display panel 19 to return to the default position (FIG. 3) when the medium setting portion 14 transitions from the unfolded state (FIG. 7) to the housed state (FIG. 8) in a state (FIG. 7) in which the position of the free end 29 of the display panel 19 is changed from the default position (FIG. 3). The display panel 19 in the state illustrated in FIG. 9 can also be returned to the default position (FIG. 3) when the medium setting portion 14 transitions from the unfolded state (FIG. 7) to the housed state (FIG. 8).

An upper limit of a displacement amount of the display panel 19 from the default position (FIG. 3), that is, an upper limit of a displacement angle is desirably set so as to fall within a range in which the display panel 19 can be pushed by causing the medium setting portion 14 to transition from the unfolded state (FIG. 7) to the housed state (FIG. 8) as described above.

Description of Effects of Embodiment 1

(1) In the present embodiment, the display panel 19 is disposed on the front surface side 40 of the base unit 55, and is disposed so as to overlap the opening/closing unit 56 in the closed state (FIG. 3) in the width direction (X-axis direction) of the transport path 2 in front view. Accordingly, by increasing the size of the display panel 19 in the overlapping direction in the width direction (X-axis direction), it is possible to suppress an increase in size of the entire image reading apparatus 1 in the width direction (X-axis direction) even when the display panel 19 is increased in size in the width direction (X-axis direction) and mounted.

(2) In addition, in the present embodiment, in the image reading apparatus 1 having the structure in which the pick roller 12 as the feeding unit 12 and the discharge roller pair 24 as the discharge unit 24 are provided and the discharge receiving portion 16 is provided at the opening/closing unit 56, the same effect as (1) described above can be obtained.

(3) In addition, in the present embodiment, the display panel 19 overlaps the opening/closing unit 56 in the closed state (FIG. 3) in the height direction (Z-axis direction) in front view. That is, by setting the size of the display panel 19 so as not to protrude from the region of the opening/closing unit 56 in the height direction (Z-axis direction) in front view, it is possible to further suppress an increase in size in the height direction (Z-axis direction) in addition to the width direction (X-axis direction).

(4) In addition, in the present embodiment, the recessed portion 21 (FIG. 4) is formed at a portion of the opening/closing unit 56 overlapping the display panel 19, and the display panel 19 can be accommodated in the recessed portion 21. Accordingly, it is possible to further suppress an increase in size of the image reading apparatus 1 in the depth direction (Y-axis direction) in addition to the width direction (X-axis direction) and the height direction (Z-axis direction). In addition, it is possible to prevent interference with the display panel 19 in an opening/closing operation of the opening/closing unit 56.

(5) In addition, in the present embodiment, the height position of the display panel 19 in the open state (FIG. 4) of the opening/closing unit 56 is the same as the height position of the display panel 19 in the closed state (FIG. 3) of the opening/closing unit 56. That is, since the height position of the display panel 19 does not change regardless of the open or closed state of the opening/closing unit 56, display information can be easily checked on the display panel 19.

(6) In addition, in the present embodiment, the medium setting portion 14 is displaceable between the unfolded state (FIG. 3) and the housed state (FIG. 2) by rotating with the base end 23 as the rotational fulcrum, and the display panel 19 is covered with the medium setting portion 14 when the medium setting portion 14 is in the housed state (FIG. 2). Thus, the display panel 19 can be protected when the image reading apparatus 1 is not in use. In addition, the gap in the depth direction (Y-axis direction) when the medium setting portion 14 is brought into the housed state (FIG. 2) is reduced.

(7) In addition, in the present embodiment, at least a part of the region of the medium setting portion 14 that covers the display panel 19 is the light transmissive member 25. Accordingly, even in the state in which the display panel 19 is covered with the medium setting portion 14, it is possible to check information displayed on the display panel 19, and it is convenient for the user.

(8) Additionally, in the present embodiment, the position of the free end 29 can be changed from the default position (FIG. 3) by rotating the display panel 19 with the base end 28 as the rotational fulcrum. Accordingly, an orientation of the display panel 19 can be easily changed so as to be easily viewed from the user. In addition, when the display panel 19 becomes an obstacle at the time of maintenance work such as cleaning of the base unit 55 or replacement of parts, the maintenance work is facilitated by causing the rotation to be performed.

(9) Additionally, in the present embodiment, the medium setting portion 14 is configured to push the display panel 19 to return to the default position (FIG. 3) when the medium setting portion 14 transitions from the unfolded state (FIG. 7) to the housed state (FIG. 8) in the state in which the position of the free end 29 of the display panel 19 is changed from the default position (FIG. 3, FIG. 7). Thus, it is convenient for the user.

Embodiment 2

Next, the image reading apparatus 1 according to Embodiment 2 will be described based on FIGS. 10 and 12. The same parts as those in Embodiment 1 are denoted by the same reference numerals, and description of the configurations and corresponding effects will be omitted.

Figure 10:
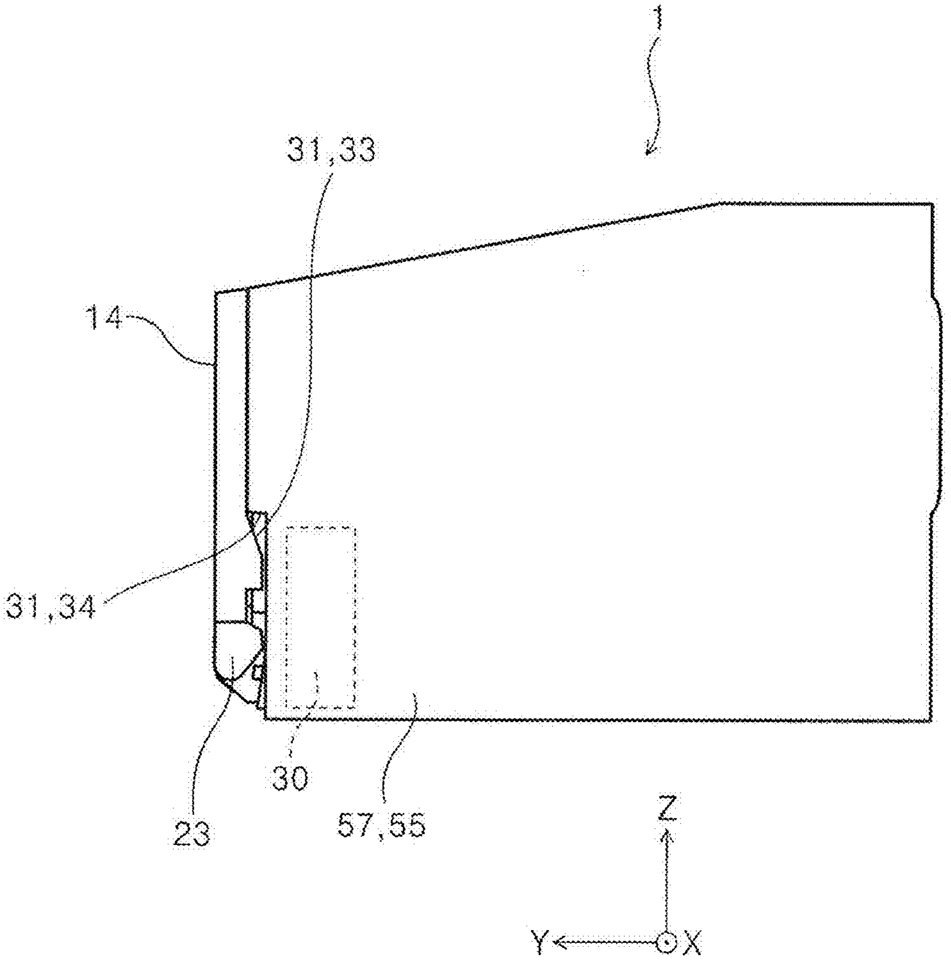
FIG. 10 is an overall side view of an image reading apparatus according to Embodiment 2.

As illustrated in FIG. 10, in the present embodiment, a driving mechanism 30 that moves the medium setting portion 14 in a housed state (FIG. 10) upward, and a first applying mechanism 31 that applies force to the medium setting portion 14 for moving from a position of the housed state (FIG. 10) to a position of an unfolded state (FIG. 12) when the medium setting portion 14 is moved upward by the driving mechanism 30.

Figure 11:
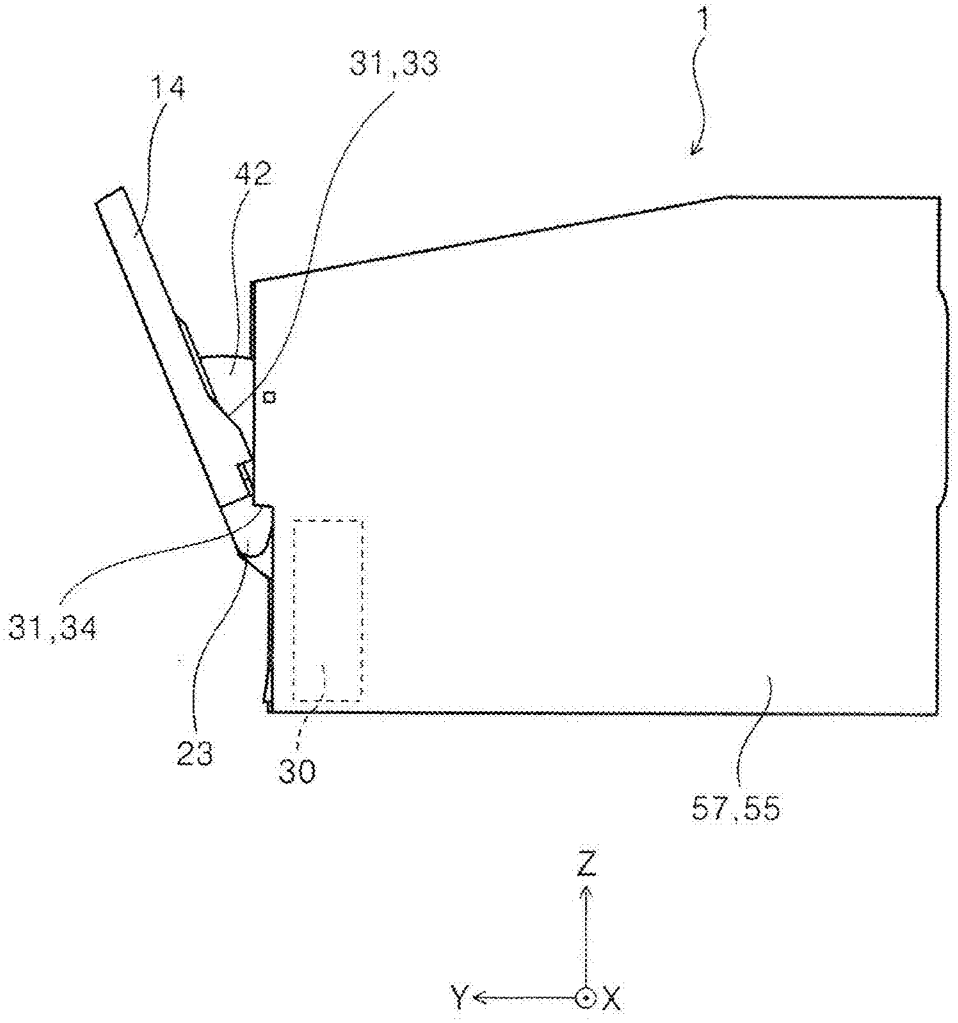
FIG. 11 is an overall side view of the image reading apparatus according to Embodiment 2.

The first applying mechanism 31 includes an inclined rib 33 provided at the medium setting portion 14 and an extrusion portion 34 provided at the right cover 57. When moving upward (the +Z direction) from a position illustrated in FIG. 10, the medium setting portion 14 moves while the inclined rib 33 and the extrusion portion 34 are in contact with each other, and thus force is applied to the medium setting portion 14 for moving from the position of the housed state (FIG. 10) to the position of the unfolded state (FIG. 12). Then, the state illustrated in FIG. 11 is reached, and thereafter, the medium setting portion 14 rotates by the medium setting portion 14's own weight, which leads to the state illustrated in FIG. 12.

A rack/pinion mechanism (not illustrated) whose operation is controlled by the control unit 71 is used as the driving mechanism 30.

Figure 12:
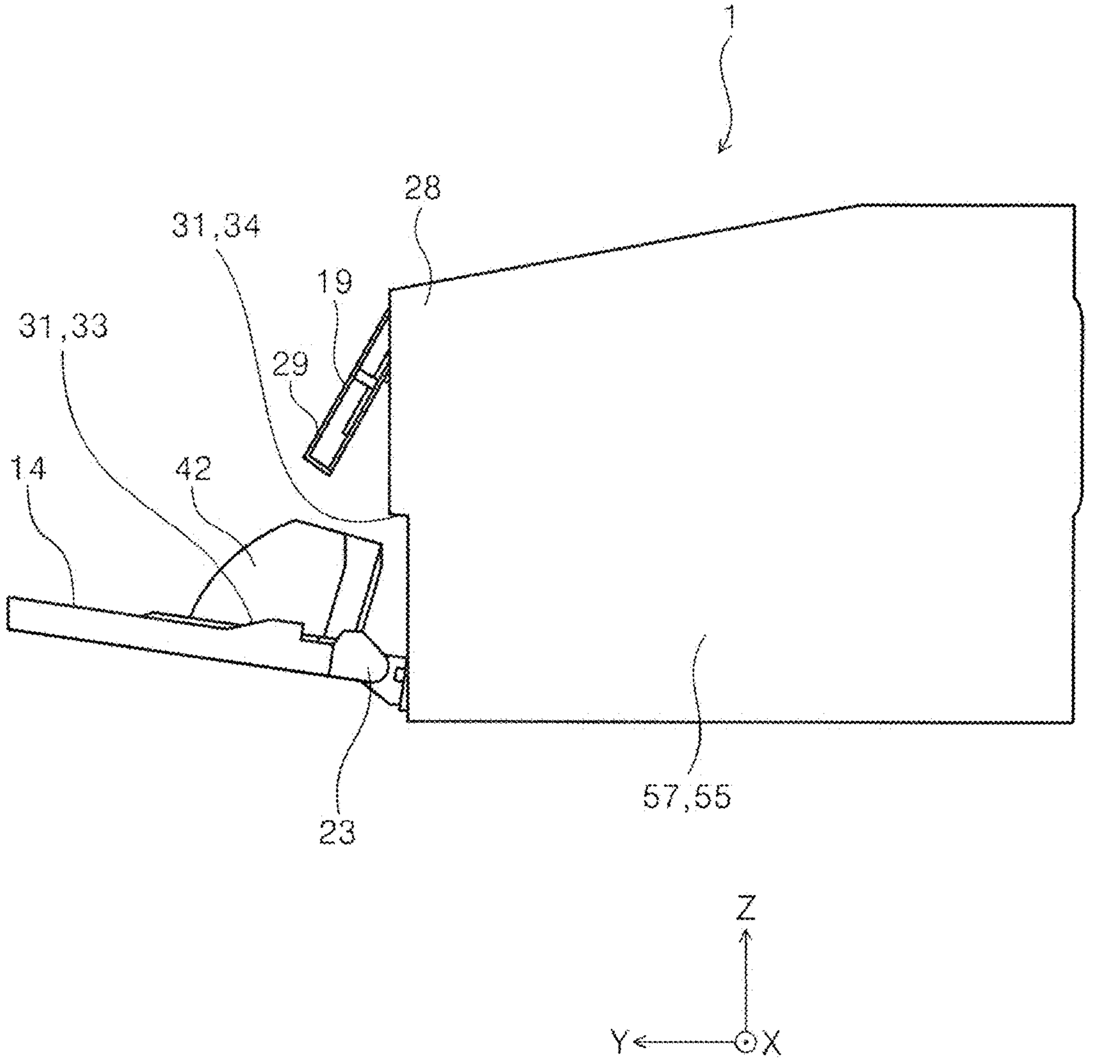
FIG. 12 is an overall side view of the image reading apparatus according to Embodiment 2.

In the present embodiment, a configuration is adopted in which, when the medium setting portion 14 is moved upward by the driving mechanism 30, the first applying mechanism 31 applies force to the medium setting portion 14 for moving from the position of the housed state (FIG. 10) to the position of the unfolded state (FIG. 12). Accordingly, for example, when the driving mechanism 30 is driven by turning on the power supply, the medium setting portion 14 starts to move upward, and additionally the first applying mechanism 31 can act on the medium setting portion 14 and automatically move the medium setting portion 14 from the position of the housed state (FIG. 10) to the position of the unfolded state (FIG. 12), which is convenient for the user.

Embodiment 3

Figure 19:
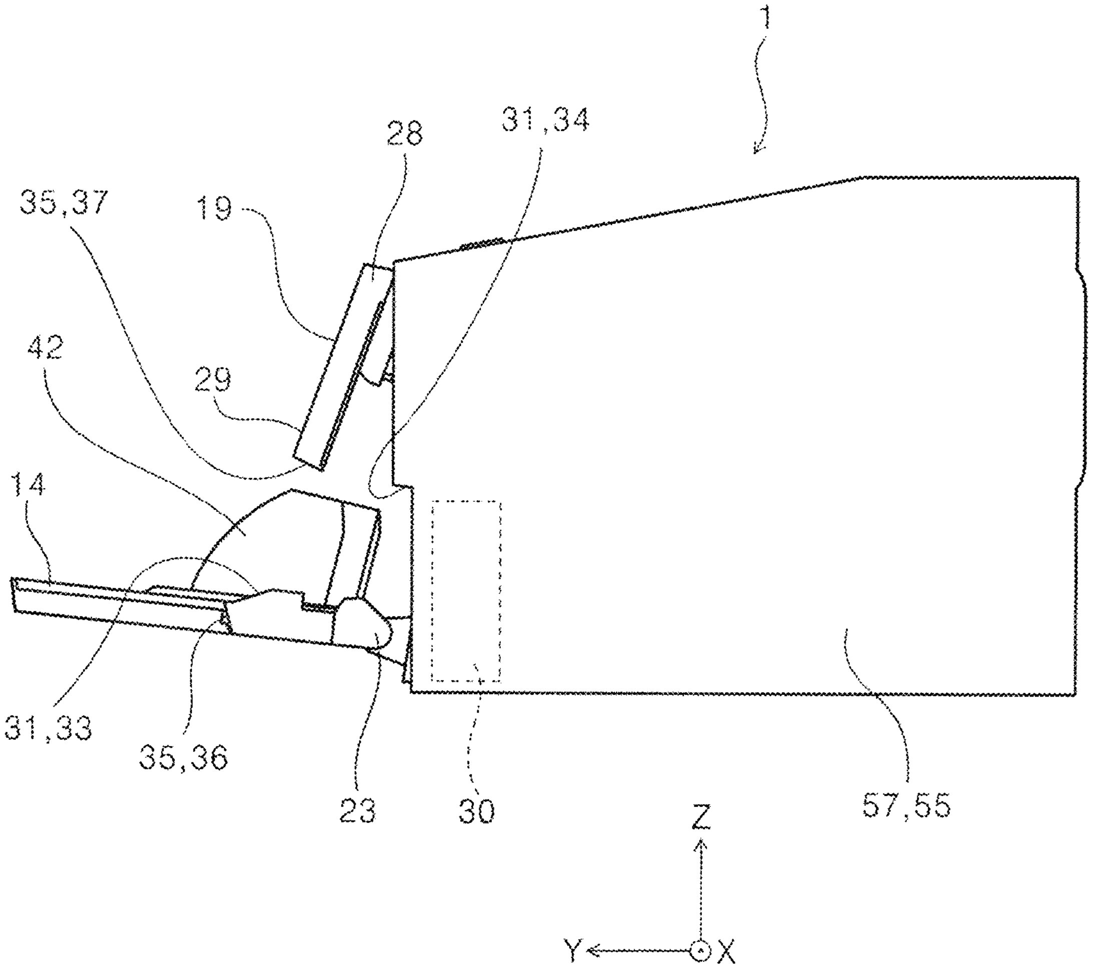
FIG. 19 is an overall side view of the image reading apparatus according to Embodiment 3.

Next, the image reading apparatus 1 according to Embodiment 3 will be described based on FIGS. 13 and 19. The same parts as those in Embodiment 1 and Embodiment 2 are denoted by the same reference numerals, and the description of the configurations and corresponding effects will be omitted.

Figure 13:
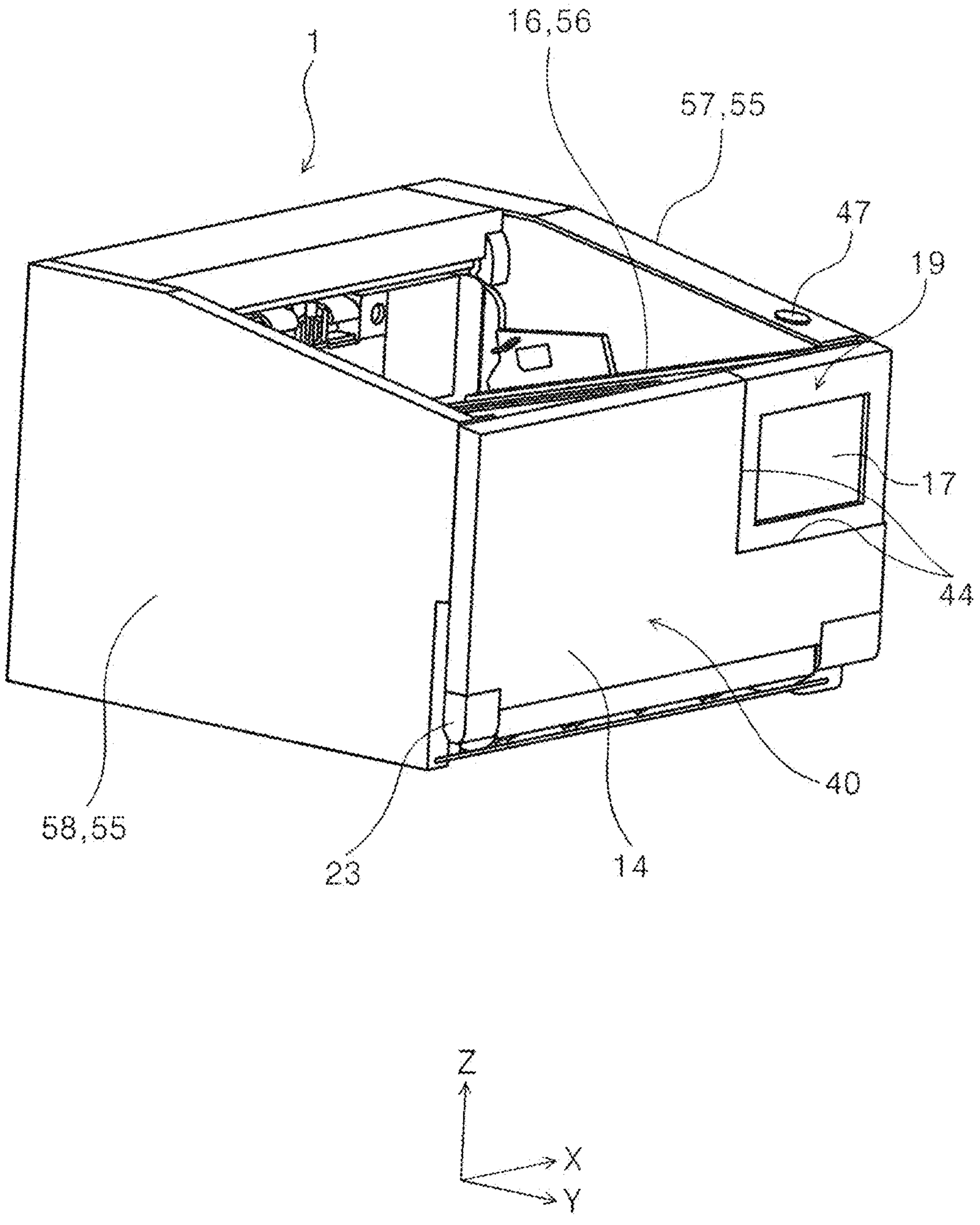
FIG. 13 is an overall perspective view of an image reading apparatus according to Embodiment 3.
Figure 14:
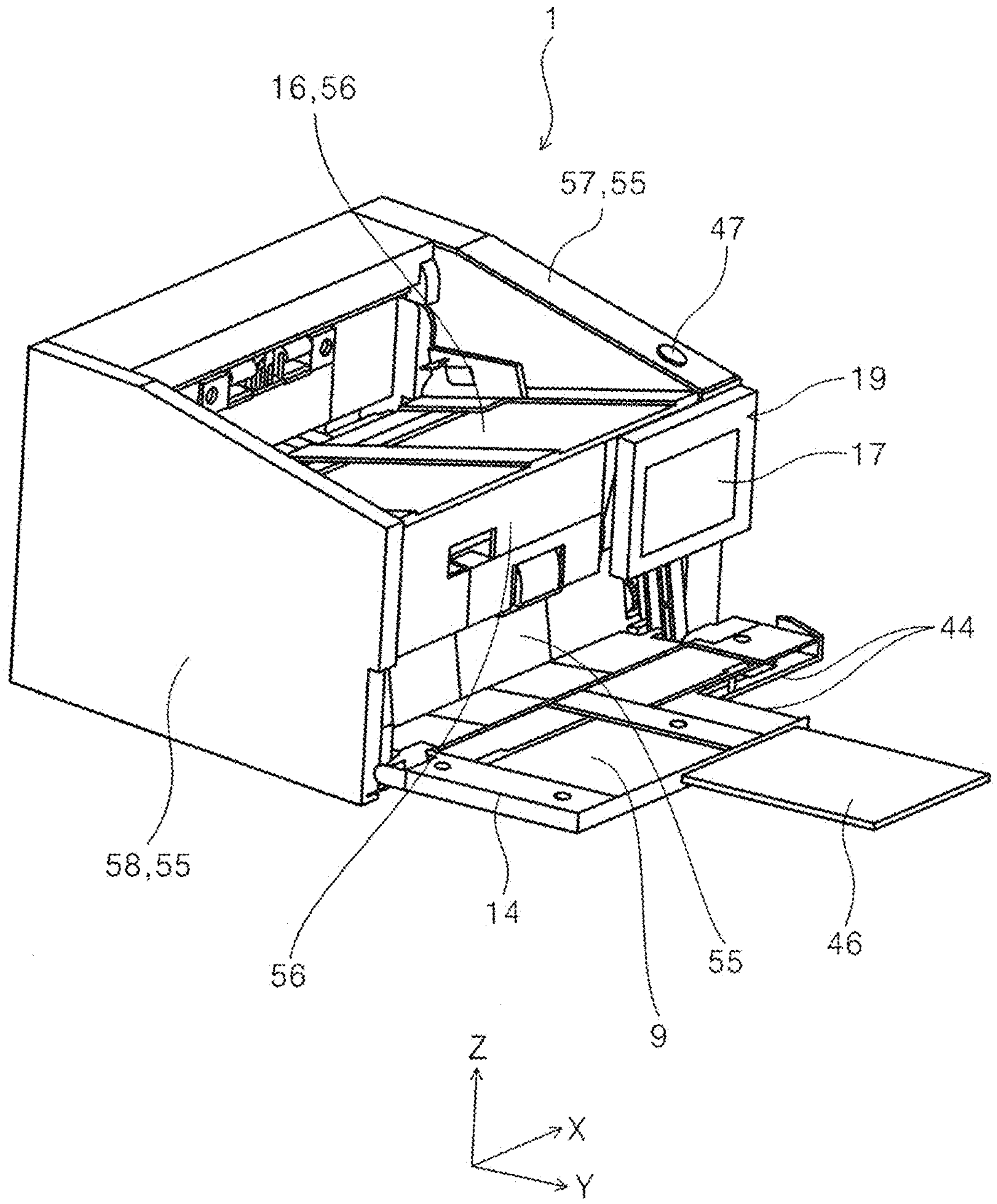
FIG. 14 is an overall perspective view of the image reading apparatus according to Embodiment 3.

As illustrated in FIGS. 13 and 14, in the present embodiment, the medium setting portion 14 is rotatable with the base end 23 as a rotational fulcrum, is displaceable between unfolded state (FIG. 14) and a housed state (FIG. 13) by rotation, and further includes a notch portion 44. The notch portion 44 is provided on a side of the medium setting portion 14 opposite to the base end 23, at a corner portion.

In other words, the notch portion 44 is formed at a position corresponding to a position of the display panel 19. The display panel 19 is configured to be housed in the notch portion 44 when the medium setting portion 14 is in the housed state (FIG. 13).

In FIGS. 13 and 14, a reference numeral 9 denotes a placement surface of the medium setting portion 14 on which the medium 3 is placed, and a reference numeral 46 denotes an extension tray. Additionally, a reference numeral 47 denotes a power switch of the image reading apparatus 1. The power switch 47 is provided at a position where a switch operation can be performed when the medium setting portion 14 is in the housed state (FIG. 13).

Additionally, as illustrated in FIGS. 15 to 19, in the present embodiment, a position of the free end 29 can be changed from a default position (FIG. 15) by rotating the display panel 19 with the base end 28 as a rotational fulcrum. Further, the driving mechanism 30 that moves the medium setting portion 14 in the housed state (FIG. 15) upward (the +Z direction) is provided. The driving mechanism 30 is the same as that of Embodiment 2, and is driven via the control unit 71 when the power switch 47 is turned on.

Then, the present embodiment includes the second applying mechanism 35 that applies force to the display panel 19 for changing from the default position (FIG. 15) when the medium setting portion 14 is moved upward (the +Z direction) by the driving mechanism 30, and the first applying mechanism 31 that applies force to the medium setting portion 14 for moving from a position of the housed state (FIG. 15) to a position of the unfolded state (FIGS. 18 and 19) when the medium setting portion 14 is further moved upward by the driving mechanism 30.

The second applying mechanism 35 includes a pressing portion 36 formed by utilizing an upper side of the notch portion 44, and a pressed portion 37 formed by utilizing a lower side of the display panel 19. The first applying mechanism 31 has the same structure as that of Embodiment 2.

When upward movement of the medium setting portion 14 is started by the driving mechanism 30, first, the pressing portion 36 of the second applying mechanism 35 presses the pressed portion 37. Accordingly, the free end 29 of the display panel 19 starts to rotate from the default position illustrated in FIG. 15 with the base end 28 as the rotational fulcrum, and a state illustrated in FIG. 16 is reached.

When the medium setting portion 14 is further moved upward, rotation of the medium setting portion 14 is started by the first applying mechanism 31, and movement from the position of the housed state (FIGS. 15 and 16) to the position of the unfolded state (FIGS. 18 and 19) is started. FIG. 17 illustrates a state obtained by further rotating the state of FIG. 16. A configuration is adopted in which the display panel 19 is continuously rotated by the second applying mechanism 35 until the state illustrated in FIG. 17 is reached and then the rotation is stopped.

Figure 16:
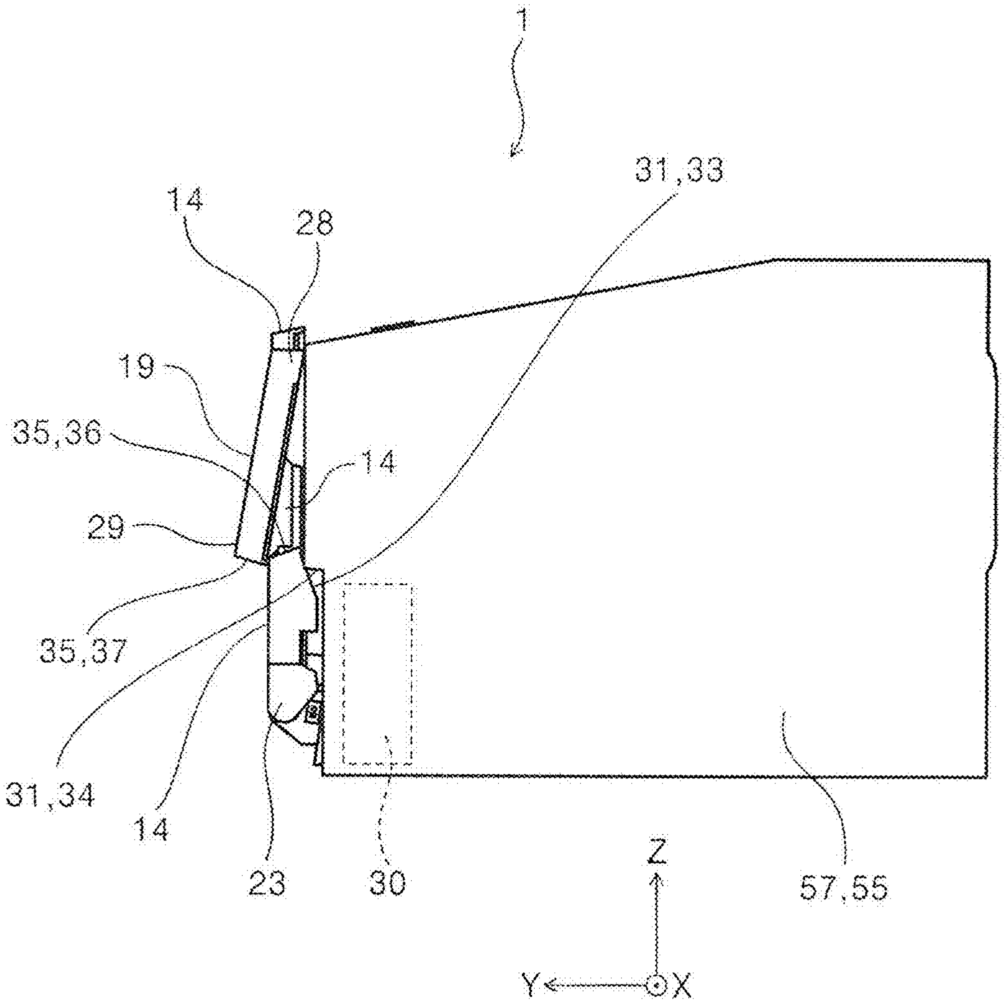
FIG. 16 is an overall side view of the image reading apparatus according to Embodiment 3.
Figure 17:
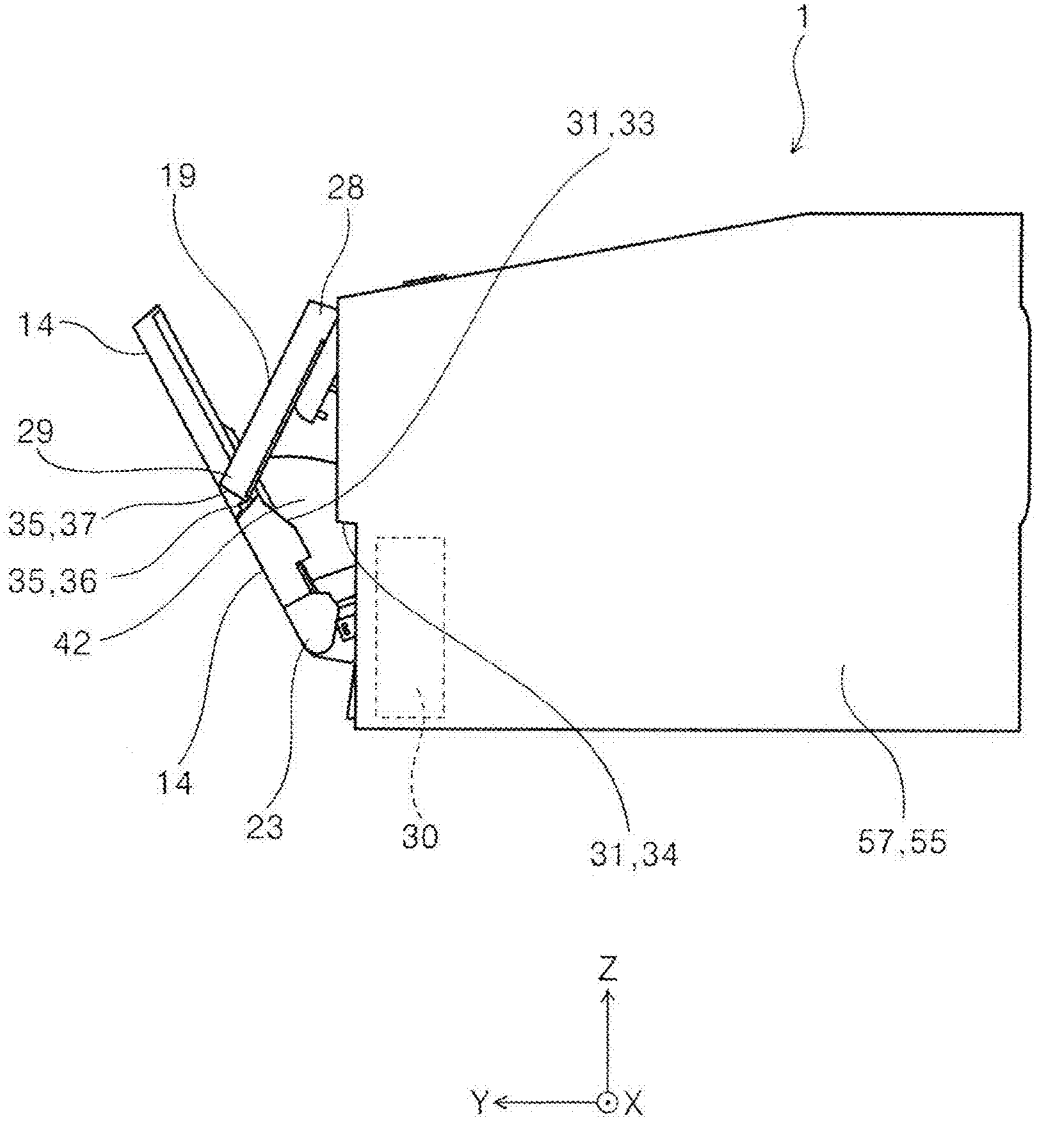
FIG. 17 is an overall side view of the image reading apparatus according to Embodiment 3.

The medium setting portion 14 does not receive the force from the first applying mechanism 31 at a rotation position between FIGS. 16 and 17, then rotates by the medium setting portion 14's own weight, and the unfolded state (FIGS. 18 and 19) is reached. After the unfolded state of FIG. 18, the medium setting portion 14 is lowered and reaches a position (FIG. 19) where the medium 3 is set.

Description of Effects of Embodiment 3

(1) In the present embodiment, the medium setting portion 14 is displaceable between the unfolded state (FIG. 14) and the housed state (FIG. 13) by rotation, and further includes the notch portion 44, and the display panel 19 is configured to be housed in the notch portion 44 when the medium setting portion 14 is in the housed state (FIG. 13). Accordingly, even in the state in which the medium setting portion 14 is at the position of the housed state (FIG. 13), it is possible to check information displayed on the display panel, and it is convenient for the user.

Figure 15:
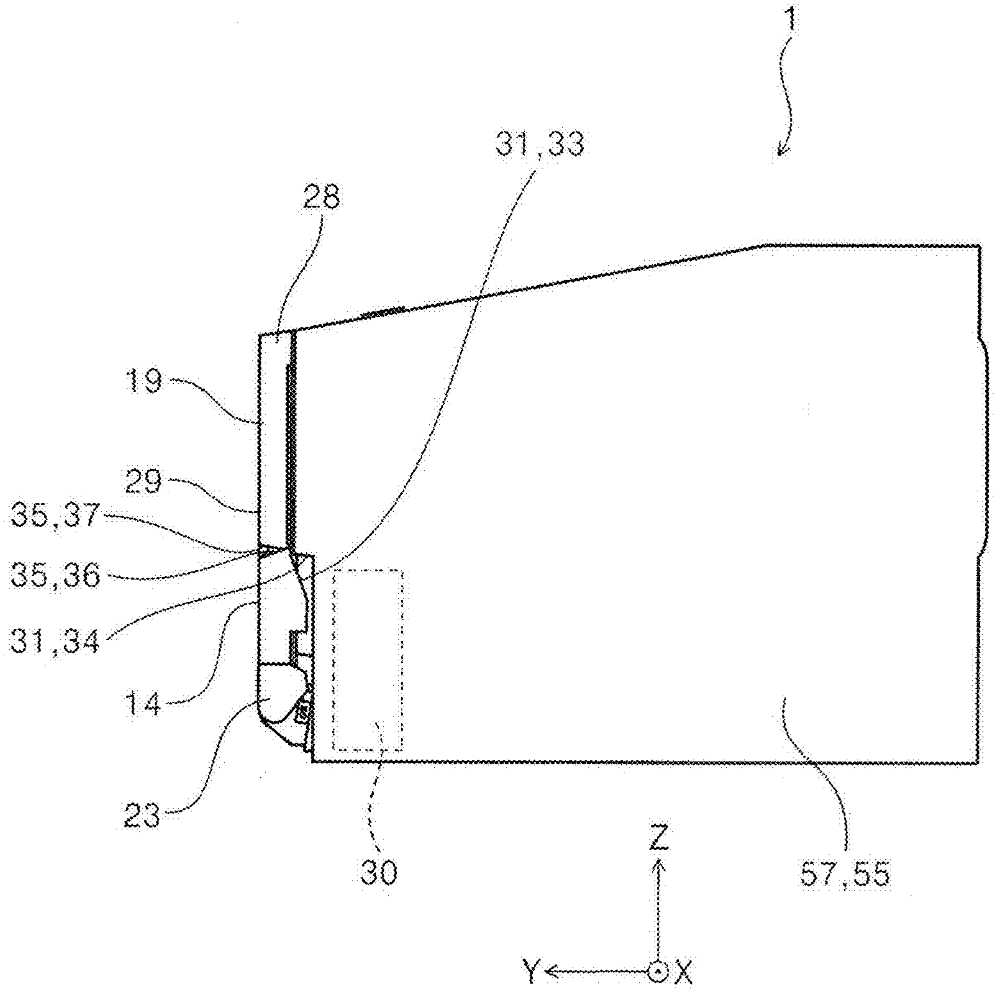
FIG. 15 is an overall side view of the image reading apparatus according to Embodiment 3.
Figure 18:
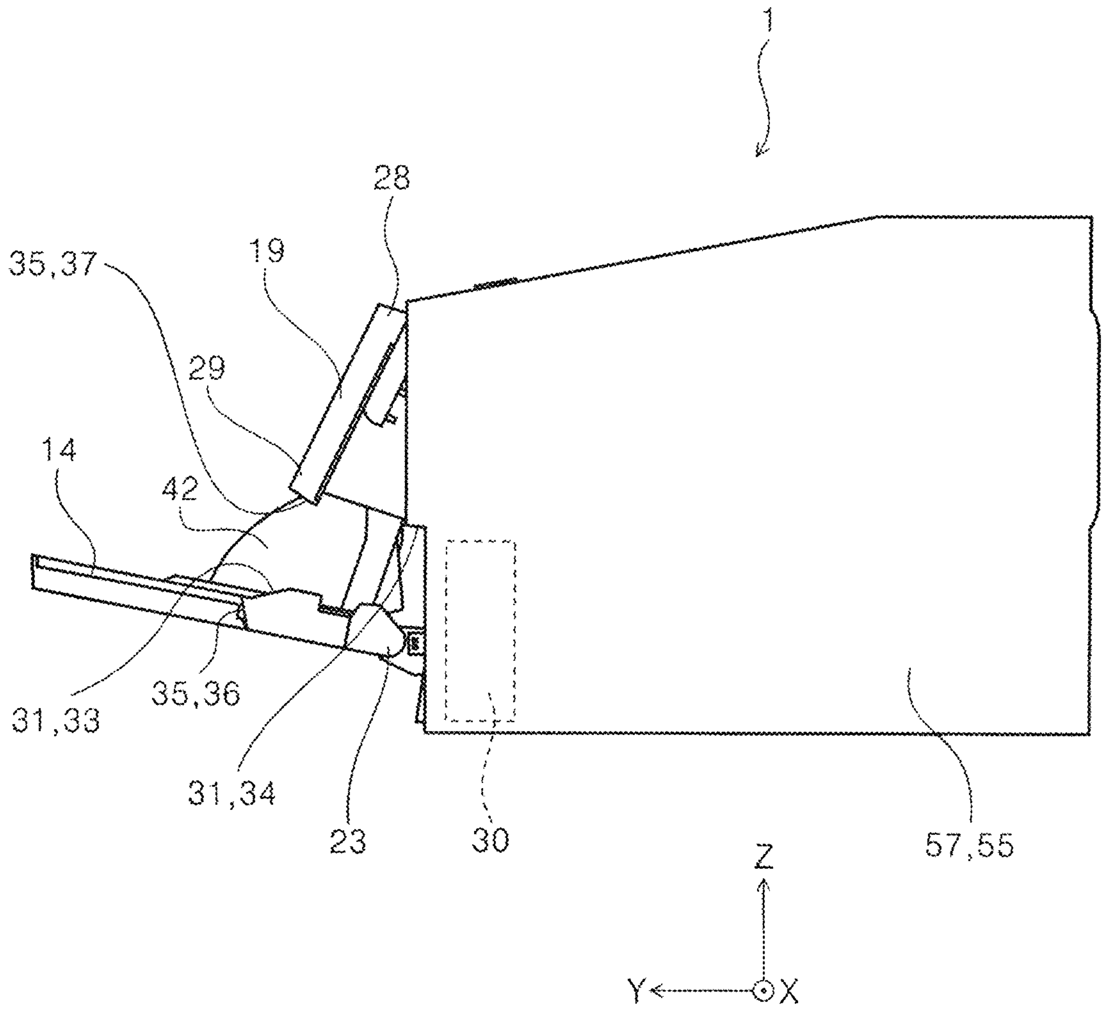
FIG. 18 is an overall side view of the image reading apparatus according to Embodiment 3.

(2) In addition, in the present embodiment, when the medium setting portion 14 is moved upward by the driving mechanism 30, the second applying mechanism 35 applies force to the display panel 19 for changing from the default position (FIG. 15). The configuration is adopted in which, subsequently, the first applying mechanism 31 applies force to the medium setting portion 14 for moving from the position of the housed state (FIG. 15) to the position of the unfolded state (FIGS. 18 and 19). Accordingly, for example, when the driving mechanism 30 is driven by turning on the power switch 47, the medium setting portion 14 starts to move upward (the +Z direction), the second applying mechanism 35 acts on the display panel 19 to rotate the display panel 19, and additionally the first applying mechanism 31 acts on the medium setting portion 14 to automatically move the medium setting portion 14 from the position of the housed state (FIG. 15) to the position of the unfolded state (FIGS. 18 and 19). That is, it is possible to sequentially and automatically perform the change of the display panel 19 from the default position (FIG. 15) to a use position (FIG. 19) and the transition of the medium setting portion 14 to the unfolded state (FIG. 19), which is convenient for the user.

Other Embodiments

The image reading apparatus 1 according to the present disclosure is based on having the configuration of the embodiment described above, but it is of course possible to change or omit a partial configuration within a scope not deviating from the gist of the disclosure of the present application.

In the above-described embodiment, the image reading apparatus which includes the first reading unit 51 and the second reading unit 52 as the reading units, and can perform double-sided reading of the first surface and the second surface of the medium 3 has been described. However, the present disclosure is also applicable to an image reading apparatus having a single-sided reading structure.

What is claimed is:

1. An image reading apparatus, comprising:

a base unit;

an opening/closing unit configured to be opened and closed with respect to the base unit;

a medium setting portion on which a medium is placed, the medium setting portion being disposed on a front surface side of the base unit;

a transport path through which the medium is transported in a transport direction, the transport path being established in a state in which the opening/closing unit is closed with respect to the base unit;

a reading unit disposed along the transport path and configured to read the medium; and a display panel provided at the base unit and configured to display information, wherein the display panel is disposed on the front surface side of the base unit, and overlaps, in front view, the opening/closing unit in a closed state in a width direction of the transport path.

2. The image reading apparatus according to claim 1, comprising:

a feeding unit configured to feed the medium placed on the medium setting portion in the transport direction; and a discharge unit configured to discharge, to a discharge receiving portion, the medium transported through the transport path and passing through the reading unit, wherein the discharge receiving portion is provided at the opening/closing unit.

3. The image reading apparatus according to claim 1, wherein the display panel overlaps, in the front view, the opening/closing unit in the closed state in a height direction.

4. The image reading apparatus according to claim 3, wherein the opening/closing unit is formed with a recessed portion at a portion overlapping the display panel, and the recessed portion is configured to accommodate the display panel.

5. The image reading apparatus according to claim 1, wherein a height position of the display panel of the opening/closing unit in an open state is the same as a height position of the display panel of the opening/closing unit in the closed state.

6. The image reading apparatus according to claim 1, wherein the medium setting portion is rotatable with a base end as a rotational fulcrum, and is displaceable between an unfolded state and a housed state by rotation, and the display panel is covered with the medium setting portion when the medium setting portion is in the housed state.

7. The image reading apparatus according to claim 6, wherein at least a part of a region of the medium setting portion covering the display panel is a light transmissive member.

8. The image reading apparatus according to claim 1, wherein a position of a free end of the display panel is changeable from a default position by rotation with a base end as a rotational fulcrum.

9. The image reading apparatus according to claim 8, wherein the medium setting portion is rotatable with the base end as the rotational fulcrum, is displaceable between an unfolded state and a housed state by rotation, and pushes the display panel back to the default position when the medium setting portion transitions from the unfolded state to the housed state in a state in which the position of the free end of the display panel is changed from the default position.

10. The image reading apparatus according to claim 9, comprising:

a driving mechanism configured to move the medium setting portion in the housed state upward; and a first applying mechanism configured to apply force to the medium setting portion for moving the medium setting portion from a position of the housed state to a position of the unfolded state when the medium setting portion is moved upward by the driving mechanism.

11. The image reading apparatus according to claim 1, wherein the medium setting portion is rotatable with a base end as a rotational fulcrum, is displaceable between an unfolded state and a housed state by rotation, and further includes a notch portion, and the display panel is housed in the notch portion when the medium setting portion is in the housed state.

12. The image reading apparatus according to claim 11, wherein a position of a free end of the display panel is changeable from a default position by rotation with the base end as the rotational fulcrum, and a driving mechanism configured to move the medium setting portion in the housed state upward, a second applying mechanism configured to apply force to the display panel for changing from the default position when the medium setting portion is moved upward by the driving mechanism, and a first applying mechanism configured to apply force to the medium setting portion for moving the medium setting portion from a position of the housed state to a position of the unfolded state when the medium setting portion is further moved upward by the driving mechanism are included.

* * * * *